US011901559B2

United States Patent
Korchev et al.

(10) Patent No.: US 11,901,559 B2
(45) Date of Patent: Feb. 13, 2024

(54) ANODE ELECTRODE COMPOSITIONS AND AQUEOUS DISPERSIONS FOR BATTERY APPLICATIONS

(71) Applicant: Cabot Corporation, Boston, MA (US)

(72) Inventors: Andriy Korchev, Westford, MA (US); Yilun Tang, Waltham, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 17/438,726

(22) PCT Filed: Feb. 21, 2020

(86) PCT No.: PCT/US2020/019198
§ 371 (c)(1),
(2) Date: Sep. 13, 2021

(87) PCT Pub. No.: WO2020/197672
PCT Pub. Date: Oct. 1, 2020

(65) Prior Publication Data
US 2022/0131156 A1 Apr. 28, 2022

Related U.S. Application Data

(60) Provisional application No. 62/822,101, filed on Mar. 22, 2019.

(51) Int. Cl.
H01M 4/62 (2006.01)
C01B 32/174 (2017.01)
(Continued)

(52) U.S. Cl.
CPC .......... *H01M 4/625* (2013.01); *C01B 32/174* (2017.08); *C09C 1/48* (2013.01); *H01M 4/133* (2013.01);
(Continued)

(58) Field of Classification Search
CPC ........ H01M 4/04; H01M 4/62; H01M 10/525; C01B 32/158
See application file for complete search history.

(56) References Cited

U.S. PATENT DOCUMENTS

| 7,691,533 B2 | 4/2010 | Sano et al. |
| 10,141,574 B2 | 11/2018 | Yoo et al. |

(Continued)

FOREIGN PATENT DOCUMENTS

| JP | 2005/063955 A | 3/2005 |
| JP | 2016/025077 A | 2/2016 |
| KR | 2008/0021002 A | 3/2008 |
| TW | 201431602 A | 8/2014 |
| WO | WO 2013/066593 A1 | 5/2013 |
| WO | WO 2013/114094 A1 | 8/2013 |

OTHER PUBLICATIONS

The International Search Report and The Written Opinion of The International Searching Authority, or the Declaration of International Application No. PCT/US2020/019195, dated May 25, 2020.

(Continued)

*Primary Examiner* — Khanh T Nguyen

(57) ABSTRACT

Carbon nanostructures are used to prepare electrode compositions for lithium ion batteries. In one example, carbon nanostructures, fragments of carbon nanostructures and/or fractured carbon nanotubes are provided in an aqueous dispersion that can be used in the manufacture of silicon-containing anodes. The aqueous dispersion can further include another conductive carbon additive such as carbon black.

18 Claims, 12 Drawing Sheets

(51) Int. Cl.
    *H01M 4/36* (2006.01)
    *H01M 4/48* (2010.01)
    *H01M 4/587* (2010.01)
    *C09C 1/48* (2006.01)
    *H01M 4/133* (2010.01)
    *H01M 4/139* (2010.01)
    *H01M 4/583* (2010.01)
    *H01M 10/0525* (2010.01)
    *H01M 4/02* (2006.01)
    *C08K 3/04* (2006.01)

(52) U.S. Cl.
    CPC ........... *H01M 4/139* (2013.01); *H01M 4/366* (2013.01); *H01M 4/483* (2013.01); *H01M 4/583* (2013.01); *H01M 4/587* (2013.01); *H01M 4/621* (2013.01); *H01M 4/622* (2013.01); *H01M 10/0525* (2013.01); *C01B 2202/04* (2013.01); *C01B 2202/06* (2013.01); *C01B 2202/22* (2013.01); *C01B 2202/34* (2013.01); *C01B 2202/36* (2013.01); *C01P 2004/03* (2013.01); *C01P 2004/04* (2013.01); *C01P 2004/54* (2013.01); *C01P 2006/12* (2013.01); *C01P 2006/19* (2013.01); *C01P 2006/22* (2013.01); *C08K 3/041* (2017.05); *H01M 2004/028* (2013.01)

(56) References Cited

U.S. PATENT DOCUMENTS

| | | | |
|---|---|---|---|
| 2005/0186378 A1* | 8/2005 | Bhatt | H01M 8/0226 428/36.9 |
| 2013/0143087 A1 | 6/2013 | Liu et al. | |
| 2014/0065447 A1 | 3/2014 | Liu et al. | |
| 2014/0099493 A1* | 4/2014 | Liu | B82Y 40/00 428/340 |
| 2014/0332731 A1 | 11/2014 | Ma et al. | |
| 2022/0158193 A1 | 5/2022 | DuPasquier et al. | |
| 2022/0181625 A1 | 6/2022 | Korchev et al. | |

OTHER PUBLICATIONS

The International Search Report and The Written Opinion of The International Searching Authority, or the Declaration of International Application No. PCT/US2020/019198, dated May 7, 2020.

The International Search Report and The Written Opinion of The International Searching Authority, or the Declaration of International Application No. PCT/US2020/019199, dated May 12, 2020.

Zhao, Xin, et al., "Spray Deposition of Steam Treated and Functionalized Single-Walled and Multi-Walled Carbon Nanotube Films for Superapacitors", 2009 IOP Publishing Ltd., Nanotechnology 20 (2009), 9 pp.

\* cited by examiner

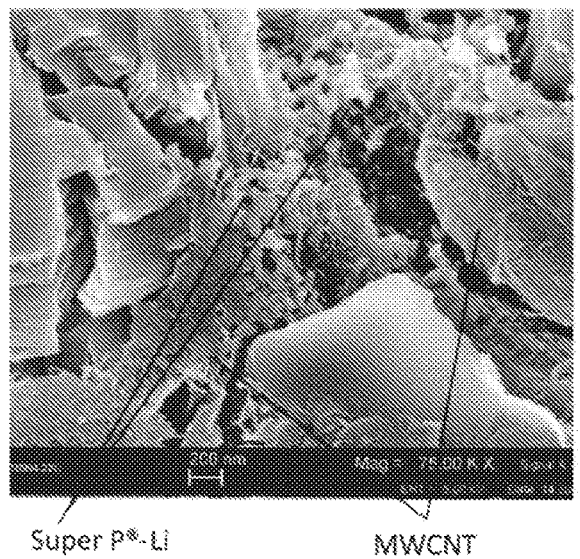
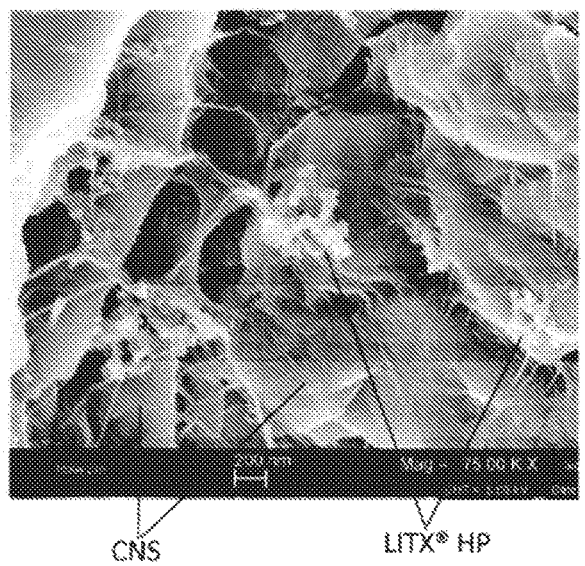
FIG. 6A
FIG. 6B

ANODE ELECTRODE COMPOSITIONS AND AQUEOUS DISPERSIONS FOR BATTERY APPLICATIONS

RELATED APPLICATIONS

This application is a national phase application of PCT/US2020/019198, filed on Feb. 21, 2020, which claims the benefit under 35 USC 119(e) of U.S. Provisional Patent Application No. 62/822,101, filed on Mar. 22, 2019. Both applications are incorporated herein by reference in their entirety.

BACKGROUND OF THE INVENTION

Lithium ion batteries (LIBs) are widespread sources of electrical energy for numerous applications ranging from electronic devices to electric vehicles. A lithium-ion battery typically includes a negative electrode and a positive electrode in an arrangement that allows lithium ions and electrons to move to and from the electrodes during charging and discharging. An electrolyte solution in contact with the electrodes provides a conductive medium in which the ions can move. To prevent direct reaction between the electrodes, an ion-permeable separator is used to physically and electrically isolate the electrodes. During operation, electrical contact is made to the electrodes, allowing electrons to flow through the device to provide electrical power, and lithium ions to move through the electrolyte from one electrode to the other.

The positive electrode typically includes a conductive substrate supporting a mixture (e.g., applied as a paste) having at least one electroactive material and a binder. The electroactive material (a lithium transition metal oxide, for example) is capable of receiving and releasing lithium ions. The binder, polyvinylidene fluoride (PVDF), for instance, is used to provide mechanical integrity and stability to the electrode. In some cases, the positive electrode also includes a conductive additive.

Most commercially available lithium ion batteries have anodes that contain graphite, a material capable of incorporating lithium through an intercalation mechanism. Typically, lithium is added to the graphite anode during the charging cycle and removed as the battery is used. Possible alternatives to graphite include materials such as lithium titanate, tin oxide, $SiO_x$ (with x typically being 1.04, 1.06, etc.) and silicon.

In addition to the active anode component (graphite, silicon, $SiO_x$, etc.), anode compositions can further include a binder component and an electrically conductive additive, e.g., a powder, that is distinct from the electroactive material. One known carbon conductive additive (CCA) is carbon black (CB).

SUMMARY OF THE INVENTION

In spite of the progress made, existing anode compositions can present problems. For instance, metallic lithium (Li) plating on graphite negative electrodes under aggressive charging conditions accelerates performance degradation and poses safety hazards for LIBs. It is believed that anode Li plating occurs when the intercalation of $Li^+$ ions into graphite becomes sluggish, causing an increase of anode polarization. Studies appear to indicate that the lithium ion intercalation process involves three successive steps: the diffusion of solvated $Li^+$ ions in the electrolyte, the interfacial charge-transfer process, and the diffusion of Li in the solid electrode material. A slowdown in any of these steps can result in anode lithium plating. Factors thought to influence the lithium ion intercalation process, resulting in anode lithium plating, include, for example, low-temperature charging, overcharging, high-rate charging, non-uniform current and potential distributions and long-term cycling.

Alloy-type anodes often exhibit relatively poor cycle life and coulombic efficiency. It is believed that these effects could be related to the formation of a two-phase region during lithiation and delithiation. The two-phase region can lead to internal stress within the anode materials if one phase undergoes a larger volume change than the other phase. This internal stress can result in the disintegration of the anode material over time. Volume changes also can result in the deterioration of electrical contact between the active anode material, conductive particles, and binder. In turn, the deterioration of electrical contact can result in diminished capacity (i.e., amount of lithium that can be incorporated per unit mass of the active anode material) over the cycle life of the anode.

A very attractive attribute associated with cells that employ silicon-containing graphite anodes relates to the high energy density that can be achieved in these batteries. Capacity anode materials such as silicon (Si) or $SiO_x$, however, have been associated with high irreversible capacity losses and poor discharge and recharge cycling, often resulting from losses in the structural integrity of the electrode.

Several failure mechanisms can be identified. For example, non-conductive by nature, Si or $SiO_x$ particles, can experience anomalously large (up to 300% in the case of Si) volume swings upon lithiation/delithiation. These volume changes can lead to particle attrition or pulverization, disconnection from the anode conductive network, delamination from the conductive copper collector and/or consumption of additional lithium ions for the growth of the solid electrolyte interphase (SEI).

The current answer for handling problems such as these is to use relatively small amounts, typically 3 to 5% by weight, of Si or $SiO_x$ in the graphite anode.

A need exists, therefore, not only for improved lithium ion batteries (LIBs), but also for improved or different techniques designed to address failure mechanisms encountered with silicon-containing anodes. New materials and methods for enhancing the cycling performance of such anodes, e.g., by increasing the loading range of these components, and thus the energy density of the battery, continue to be needed.

Some CCA materials with the potential of enhancing performance and avoiding battery failure include conductive carbon black (CB), e.g., with aciniform morphology, and carbon nanotubes (CNTs). While conductive additives such as, for instance CCAs, can control anode deterioration to some degree, it is desirable to continue developing more efficient CCA materials and/or approaches for delivering such additives during the conventional anode fabrication process. This is particularly important with scaled-up operations, in the commercial battery manufacturing setting, for example. Also needed are approaches compatible with the aqueous-based processes currently used in the industry.

Since, generally, the CCA and the binder are not involved in the electrochemical reactions that generate electrical energy, these materials can negatively affect certain performance characteristics (e.g., capacity and energy density) of the battery, as they effectively lower the amount of active material that can be contained in a given volume. To achieve a certain performance level, however, a CCA such as CB may be required in relatively high amounts (for example, at least 1 weight % (wt %) of a graphite anode).

CNTs may be thought of as an attractive additive material for anode compositions. However, some difficulties can be encountered when working with CNTs. These include limited dispersibility in some media and inadequate purity. It is believed that at least some of these issues are caused by the strong Van der Waals forces that occur between individual carbon nanotubes, causing them to agglomerate into bundles or ropes. Such manifestations can result in lower than anticipated property enhancements and/or inconsistent performance.

In some cases, undispersed or agglomerated CNTs can raise issues with anode slurry stability or create defects upon slurry coating process. The latter may result in the production of high level of off-quality anodes. Often, techniques available for de-bundling carbon nanotubes into individual, well-separated members, can detrimentally impact the desirable property enhancements relative to the enhancements anticipated with pristine carbon nanotubes.

It was discovered that using carbon nanostructures (CNSs) can have a positive impact on anode performance, especially in the case of Si-containing anodes, and address at least some of the problems discussed above.

As used herein, the term "carbon nanostructure" or "CNS" refers to a plurality of carbon nanotubes (CNTs) that can exist as a polymeric structure by being interdigitated, branched, crosslinked, and/or sharing common walls with one another. Thus, CNSs can be considered to have CNTs, such as, for instance, multi-wall carbon nanotubes (MWCNTs) as a base monomer unit of their polymeric structure. Typically, CNSs are grown on a substrate (e.g., a fiber material) under CNS growth conditions. In such cases, at least a portion of the CNTs in the CNSs can be aligned substantially parallel to one another, much like the parallel CNT alignment seen in conventional carbon nanotube forests.

As described in U.S. Provisional Patent Application No. 62/822,101, entitled *Anode Electrode Compositions for Battery Applications*, filed on Mar. 22, 2019, incorporated herein by this reference in its entirety, and in U.S. Non Provisional Application with the title *Anode Electrode Compositions for Battery Applications*, filed concurrently herewith, also incorporated herein by this reference in its entirety, even very low levels (e.g., less than 1 wt %, and often no more than about 0.5 wt %, or even no more than 0.1 wt %) of CNSs were found to reduce or eliminate Li plating on a graphite anode during aggressive charging and/or significantly improve the cycling life of the battery. In some cases, use of CNSs could also improve low temperature cycling. With graphite anode compositions, the improvements observed with even small amounts of CNSs are surprising, considering that graphite itself has good electrical properties.

Use of a composition prepared from a CNS starting material is expected to yield electrodes that exhibit at least the same and often improved electrical properties relative to comparative electrode compositions formulated with conventional carbon additives such as CB at the same level of loading.

When used as a CCA, CNSs may present several advantages over ordinary CNTs, possibly due to the CNS unique structure. Also, in contrast to CNTs, CNSs can be provided in forms (powders, for instance) that are easy and safe to handle on the industrial scale. In some cases, CNSs form stable dispersions in a desired solvent.

Combining CNSs with another type of CCA, CB, for example, was found to provide further advantages. A high (OAN) structure conductive CB, for instance, may improve low temperature performance of anodes as the result of enhancing its electrolyte retention. For anode compositions with low CNS loadings (<1% or «1%), a high structure, conductive CB additives can be useful to further improve anode basic performance, such as cycling and fast charging or balance the cost.

Improving the mode in which CNSs (alone or in combination with another CCA, e.g., a CB) are incorporated in anode compositions remains highly desirable. While possible options include "dry" or "direct" kneading, as well as high shear milling of CNSs with graphite, methods by which CNSs can be delivered during a customer's kneading operation, as part of an on-site manufacturing process, continue to be needed. Of particular interest are compositions that can be supplied to a customer, e.g., for a kneading operation or planetary mixer operation as pre-made and/or ready to use aqueous dispersions.

Thus, in some of its aspects, the invention relates to compositions prepared from CNSs and CB. Specific embodiments relate to Si-containing graphite anode compositions, electrodes and/or LIBs that include CB, together with CNSs, CNS fragments (that can be derived from CNSs) and/or fractured CNTs (which are derived from CNSs and retain structural features of carbon nanotube branching and shared walls).

In some cases, CB (e.g., in an amount no greater than about 5 wt %) used as a first conductive additive and a second conductive additive that includes one or more of CNSs, CNS fragments and/or fractured CNTs are found to impart the desired electrical properties even when the second conductive additive is incorporated in relatively low amounts, e.g., less than 1 weight percent (wt %) and often no more than 0.5 wt % or even no more than 0.1 wt %. It is believed that this effect is due, at least in part, to the formation of fragments that sustain branching, allowing better connectivity between them and creating enhanced conductivity connections.

Other embodiments relate to dispersions containing CNSs without another carbon conductive additive, or a combination or blend of CNSs and CB. In some implementations, these dispersions have properties that facilitate their integration in the fabrication process of LIB anode electrodes such as, for instance, Si-containing graphite anodes.

The invention presents many advantages, some of which are derived from the unique morphology characterizing CNSs. In some embodiments, the CNSs employed generate fragments (including partially fragmented CNSs) and/or fractured CNTs. These structures, fragments that sustain branching, for instance, can bring about improved connectivity between one another, thereby enhancing electrical conductivity in the electrode. The use of CNSs can result in the formation of a flexible conductive network of high aspect ratio CNTs with good coverage of active anode particles at low carbon loading. The branching nature of CNSs is expected to provide good grip onto active anode particles, thus improving the association of CNS conductive network with graphite and silicon-containing particles. This is particularly important in the case of silicon-containing particles that will experience large volume swings upon battery cycling. It is also possible that CNSs, and particularly a blend of CNSs and conductive CB, enhance electrolyte retention around active particles, which is critical for low temp performance and long-term cycling.

With anode compositions that contain Si or $SiO_x$ (materials less conductive than graphite), at least some of the benefits associated with the use of CNSs may be due to improvements in electrical conductivity, connectivity and, importantly, silicon swelling management.

In many cases, conductive additives such as described herein are thought to bring about anode properties (e.g., capacity retention with cycling) that are typically achieved at higher loadings when using a conventional additive such as, for example, CB. Relative to a comparative electrode composition (containing only CB as a conductive additive), an electrode additive according to principles described herein will not typically require the use of higher amounts to achieve the same or essentially the same electrical properties; in many cases, the required levels of an additive that includes CNSs will be lower than those needed with traditional carbon additives.

Reducing the amount of conductive additive necessary to achieve a certain performance makes possible the production of electrodes that contain higher amounts of active electrode materials in the given electrode volume. Also, utilizing higher concentrations of $SiO_x$ or Si in the graphite anode may require much larger amount of conductive additives, which could end up being no longer practical. Consequently, a more efficient conductive additive, which can be used at low loading (e.g. <1 wt %) with at least 7-10 wt % Si or $SiO_x$ in the graphite anode can be viewed as important.

One of the practical consequences of targeting low CCA loadings, e.g., <1% CNSs, in the electrode formulation is the need to insure uniform distribution of such low quantity of encapsulated granular product throughout the electrode. Providing the CNS material in the form of a stable aqueous dispersion or suspension can address these concerns, formulate at very low («1%) CNS loading and avoid having specialized dispersing equipment at the LIB manufacturing plant.

Anode compositions based on combinations of CNSs and CB, may increase cycling and/or the low temperature performance of Si- or $SiO_x$-containing anodes and LIB s comprising such anodes. For example, a high (OAN) structure conductive carbon black may help with improving low temperature performance of the anodes as the result of enhancing its electrolyte retention. For anode compositions with low CNS loadings (<1% or «1%), high structure conductive carbon black additives can be useful to further improve anode basic performance, such as cycling and fast charging or balance the cost.

Having a stable aqueous dispersion comprising both CNSs and a high structure conductive CB additive may simplify the LIB manufacturing process and increase its flexibility. Simplification can be derived from circumventing the handling of low density conductive carbon black powder at the commercial line, a feature that can also improve throughput and cleanness. With respect to flexibility, the agglomeration issue in anode slurries can be caused by combining additives from various suppliers. This problem is generally related to either poor stability for one of the components or chemical incompatibility. A stable aqueous dispersion that has both CNSs and conductive carbon black is believed to represent an effective approach for addressing this challenge and produce electrodes with good dispersion level for both types of conductive additives.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6A is a SEM image of an anode prepared using multiwall carbon nanotubes (MWCNTs) and Super P®-Li conductive carbon black;

FIG. 6B is a SEM image of an anode prepared using carbon nanostructures (CNSs) and LITX® HP conductive carbon black.

DETAILED DESCRIPTION OF THE PREFERRED EMBODIMENTS

Figure 1A:
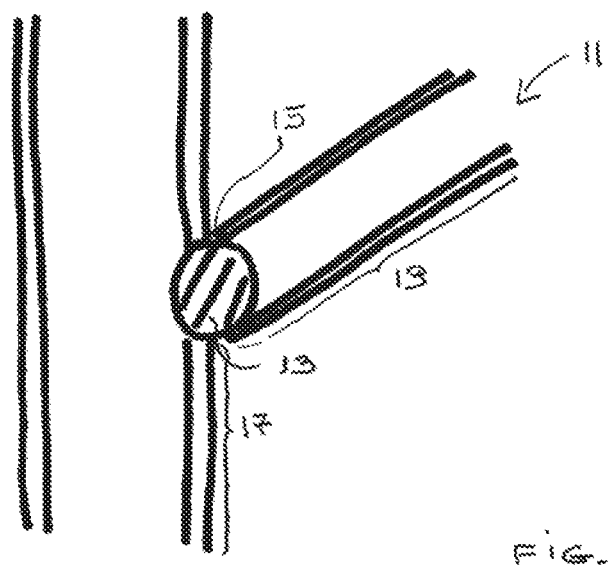
FIGS. 1A and 1B are diagrams illustrating differences between a Y-shaped MWCNT, not in or derived from a carbon nanostructure (FIG. 2A), and a branched MWCNT (FIG. 2B) in a carbon nanostructure.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The invention generally relates to compositions, methods for preparing and methods for using such compositions. Specific applications involve anodes for lithium ion batteries, such as, for instance, rechargeable LIBs.

Examples of various types of lithium ion batteries (according to the acronyms for the electroactive material employed to form the cathode, often an intercalation compound) include: LCO (lithium cobalt oxide), LMO (lithium manganese oxide), NCM (lithium nickel cobalt manganese oxide), NCA (lithium nickel cobalt aluminum oxide), LCP (lithium cobalt phosphate), LFP (lithium iron phosphate), LFSF (lithium iron fluorosulfate), LTS (lithium titanium sulfide) and others, as known in the art or as developed in the future. Materials such as these are generally referred to herein as "lithium transition metal compounds", e.g., "lithium transition metal oxides".

In many of its aspects, the invention relates to a composition that is prepared using carbon nanostructures (CNSs, singular CNS), a term that refers herein to a plurality of carbon nanotubes (CNTs) that that are crosslinked in a polymeric structure by being branched, e.g., in a dendrimeric fashion, interdigitated, entangled and/or sharing common walls with one another. Operations conducted to prepare the compositions, electrodes and/or batteries described herein can generate CNS fragments and/or fractured CNTs. Fragments of CNSs are derived from CNSs and, like the larger CNS, include a plurality of CNTs that are crosslinked in a polymeric structure by being branched, interdigitated, entangled and/or sharing common walls. Fractured CNTs are derived from CNSs, are branched and share common walls with one another.

Highly entangled CNSs are macroscopic in size and can be considered to have a carbon nanotube (CNT) as a base monomer unit of its polymeric structure. For many CNTs in the CNS structure, at least a portion of a CNT sidewall is shared with another CNT. While it is generally understood that every carbon nanotube in the CNS need not necessarily be branched, crosslinked, or share common walls with other CNTs, at least a portion of the CNTs in the carbon nanostructure can be interdigitated with one another and/or with branched, crosslinked, or common-wall carbon nanotubes in the remainder of the carbon nanostructure.

As known in the art, carbon nanotubes (CNT or CNTs plural) are carbonaceous materials that include at least one sheet of $sp^2$-hybridized carbon atoms bonded to each other to form a honey-comb lattice that forms a cylindrical or tubular structure. The carbon nanotubes can be single-walled carbon nanotubes (SWCNTs) or multi-walled carbon nanotubes (MWCNTs). SWCNTs can be thought of as an allotrope of $sp^2$-hybridized carbon similar to fullerenes. The structure is a cylindrical tube including six-membered carbon rings. Analogous MWCNTs, on the other hand, have several tubes in concentric cylinders. The number of these concentric walls may vary, e.g., from 2 to 25 or more. Typically, the diameter of MWNTs may be 10 nm or more, in comparison to 0.7 to 2.0 nm for typical SWNTs.

In many of the CNSs used in this invention, the CNTs are MWCNTs, having, for instance, at least 2 coaxial carbon nanotubes. The number of walls present, as determined, for example, by transmission electron microscopy (TEM), at a magnification sufficient for analyzing the number of wall in a particular case, can be within the range of from 2 to 30 or so, for example: 4 to 30; 6 to 30; 8 to 30; 10 to 30; 12 to 30; 14 to 30; 16 to 30; 18 to 30; 20 to 30; 22 to 30; 24 to 30; 26 to 30; 28 to 30; or 2 to 28; 4 to 28; 6 to 28; 8 to 28; 10 to 28; 12 to 28; 14 to 28; 16 to 28; 18 to 28; 20 to 28; 22 to 28; 24 to 28; 26 to 28; or 2 to 26; 4 to 26; 6 to 26; 8 to 26; 10 to 26; 12 to 26; 14 to 26; 16 to 26; 18 to 26; 20 to 26; 22 to 26; 24 to 26; or 2 to 24; 4 to 24; 6 to 24; 8 to 24; 10 to 24; 12 to 24; 14 to 24; 16 to 24; 18 to 24; 20 to 24; 22 to 24; or 2 to 22; 4 to 22; 6 to 22; 8 to 22; 10 to 22; 12 to 22; 14 to 22; 16 to 22; 18 to 22; 20 to 22; or 2 to 20; 4 to 20; 6 to 20; 8 to 20; 10 to 20; 12 to 20; 14 to 20; 16 to 20; 18 to 20; or 2 to 18; 4 to 18; 6 to 18; 8 to 18; 10 to 18; 12 to 18; 14 to 18; 16 to 18; or 2 to 16; 4 to 16; 6 to 16; 8 to 16; 10 to 16; 12 to 16; 14 to 16; or 2 to 14; 4 to 14; 6 to 14; 8 to 14; 10 to 14; 12 to 14; or 2 to 12; 4 to 12; 6 to 12; 8 to 12; 10 to 12; or 2 to 10; 4 to 10; 6 to 10; 8 to 10; or 2 to 8; 4 to 8; 6 to 8; or 2 to 6; 4-6; or 2 to 4.

Since a CNS is a polymeric, highly branched and cross-linked network of CNTs, at least some of the chemistry observed with individualized CNTs may also be carried out on the CNS. In addition, some of the attractive properties often associated with using CNTs also are displayed in materials that incorporate CNSs. These include, for example, electrical conductivity, attractive physical properties including good tensile strength when integrated into a composite, such as a thermoplastic or thermoset compound, thermal stability (sometimes comparable to that of diamond crystals or in-plane graphite sheets) and/or chemical stability, to name a few.

However, as used herein, the term "CNS" is not a synonym for individualized, un-entangled structures such as "monomeric" fullerenes (the term "fullerene" broadly referring to an allotrope of carbon in the form of a hollow sphere, ellipsoid, tube, e.g., a carbon nanotube, and other shapes). In fact, many embodiments of the invention highlight differences and advantages observed or anticipated with the use of CNSs as opposed to the use of their CNTs building blocks. Without wishing to be held to a particular interpretation, it is believed that the combination of branching, crosslinking, and wall sharing among the carbon nanotubes in a CNS reduces or minimizes the van der Waals forces that are often problematic when using individual carbon nanotubes in a similar manner.

In addition, or alternatively to performance attributes, CNTs that are part of or are derived from a CNS can be characterized by a number of features, at least some of which can be relied upon to distinguish them from other nanomaterials, such as, for instance, ordinary CNTs (namely CNTs that are not derived from CNSs and can be provided as individualized, pristine or fresh CNTs).

In many cases, a CNT present in or derived from a CNS has a typical diameter of 100 nanometers (nm) or less, such as, for example, within the range of from about 5 to about 100 nm, e.g., within the range of from about 10 to about 75, from about 10 to about 50, from about 10 to about 30, from about 10 to about 20 nm.

In specific embodiments, at least one of the CNTs has a length that is equal to or greater than 2 microns, as determined by SEM. For example, at least one of the CNTs will have a length within a range of from 2 to 2.25 microns; from 2 to 2.5 microns; from 2 to 2.75 microns; from 2 to 3.0 microns; from 2 to 3.5 microns; from 2 to 4.0 microns; or from 2.25 to 2.5 microns; from 2.25 to 2.75 microns; from 2.25 to 3 microns; from 2.25 to 3.5 microns; from 2.25 to 4 microns; or from 2.5 to 2.75 microns; from 2.5 to 3 microns; from 2.5 to 3.5 microns; from 2.5 to 4 microns; or from 3 to 3.5 microns; from 3 to 4 microns; of from 3.5 to 4 microns or higher. In some embodiments, more than one, e.g., a portion such as a fraction of at least about 0.1%, at least about 1%, at least about 10%, at least about 15%, at least about 20%, at least about 25%, at least about 30%, at least about 35%, at least about 40, at least about 45%, at least about 50% or even more than one half, of the CNTs, as determined by SEM, can have a length greater than 2 microns, e.g., within the ranges specified above.

The morphology of CNTs present in a CNS, in a fragment of a CNS or in a fractured CNT derived from a CNS will often be characterized by a high aspect ratio, with lengths typically more than 100 times the diameter, and in certain cases much higher. For instance, in a CNS (or CNS fragment), the length to diameter aspect ratio of CNTs can be within a range of from about 200 to about 1000, such as, for instance, from 200 to 300; from 200 to 400; from 200 to 500; from 200 to 600; from 200 to 700; from 200 to 800; from 200 to 900; or from 300 to 400; from 300 to 500; from 300 to 600; from 300 to 700; from 300 to 800; from 300 to 900; from 300 to 1000; or from 400 to 500; from 400 to 600; from 400 to 700; from 400 to 800; from 400 to 900; from 400 to 1000; or from 500 to 600; from 500 to 700; from 500 to 800; from 500 to 900; from 500 to 1000; or from 600 to 700; from 600 to 800; from 600 to 900; from 600 to 1000; from 700 to 800; from 700 to 900; from 700 to 1000; or from 800 to 900; from 800 to 1000; or from 900 to 1000.

It has been found that in CNSs, as well as in structures derived from CNSs (e.g., in fragments of CNSs or in fractured CNTSs) at least one of the CNTs is characterized by a certain "branch density". As used herein, the term "branch" refers to a feature in which a single carbon nanotube diverges into multiple (two or more), connected multiwall carbon nanotubes. One embodiment has a branch density according to which, along a two-micrometer length of the carbon nanostructure, there are at least two branches, as determined by SEM. Three or more branches also can occur Further features (detected using TEM or SEM, for example) can be used to characterize the type of branching found in CNSs relative to structures such as Y-shaped CNTs that are not derived from CNSs. For instance, whereas Y-shaped CNTs, have a catalyst particle at or near the area (point) of branching, such a catalyst particle is absent at or near the area of branching occurring in CNSs, fragments of CNSs or fractured CNTs.

In addition, or in the alternative, the number of walls observed at the area (point) of branching in a CNS, fragment of CNS or fractured CNTs, differ from one side of the branching (e.g., before the branching point) to the other side of this area (e.g., after or past the branching point). Such a change in in the number of walls, also referred to herein as an "asymmetry" in the number of walls, is not observed with ordinary Y-shaped CNTs (where the same number of walls is observed in both the area before and the area past the branching point).

Figure 1B:
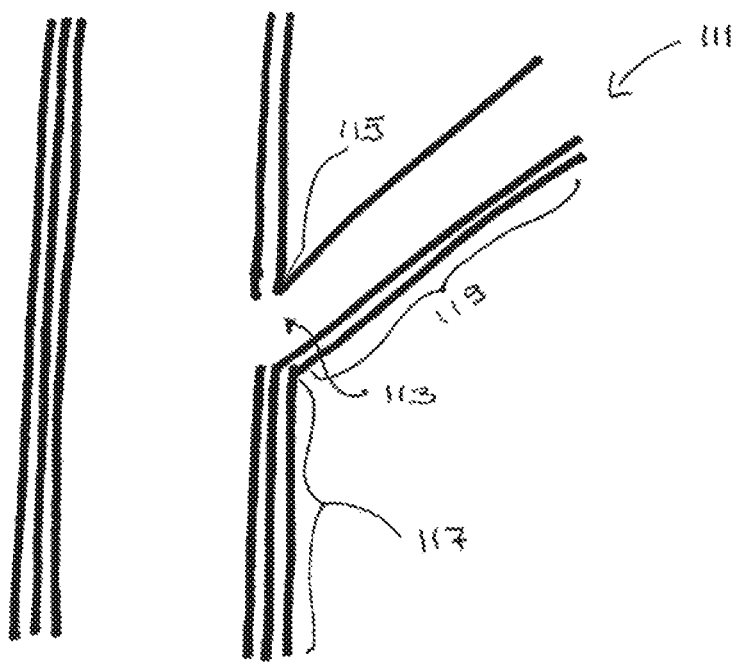

Diagrams illustrating these features are provided in FIGS. 1A and 1B. Shown in FIG. 1A, is an exemplary Y-shaped CNT 11 that is not derived from a CNS. Y-shaped CNT 11 includes catalyst particle 13 at or near branching point 15. Areas 17 and 19 are located, respectively, before and after the branching point 15. In the case of a Y-shaped CNT such as Y-shaped CNT 11, both areas 17 and 19 are characterized by the same number of walls, i.e., two walls in the drawing.

In contrast, in a CNS, a CNT building block 111, that branches at branching point 115, does not include a catalyst particle at or near this point, as seen at catalyst devoid region 113. Furthermore, the number of walls present in region 117, located before, prior (or on a first side of) branching point 115 is different from the number of walls in region 119 (which is located past, after or on the other side relative to branching point 115. In more detail, the three-walled feature found in region 117 is not carried through to region 119 (which in the diagram of FIG. 1B has only two walls), giving rise to the asymmetry mentioned above.

Figure 2A:
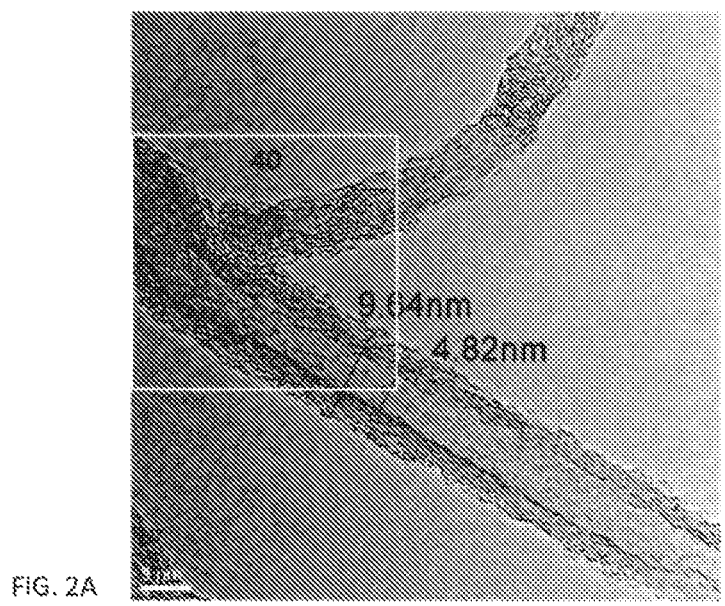
FIGS. 2A and 2B are TEM images showing features characterizing multiwall carbon nanotubes found in carbon nanostructures.
Figure 2B:
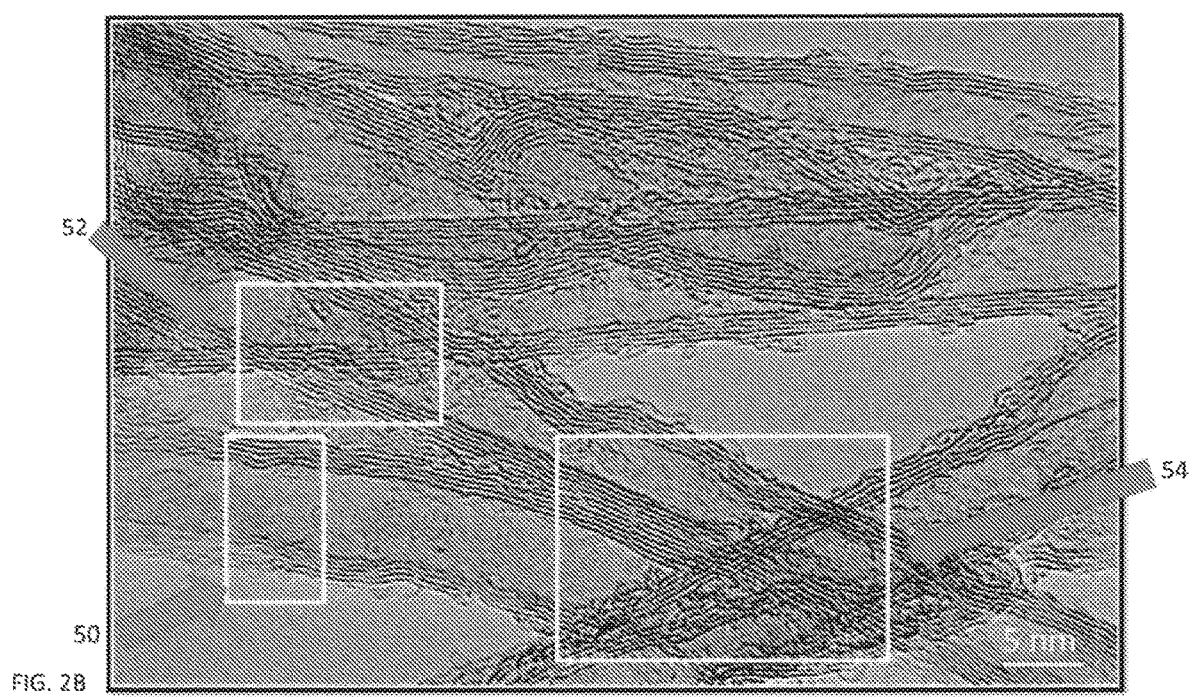
Figure 2C:
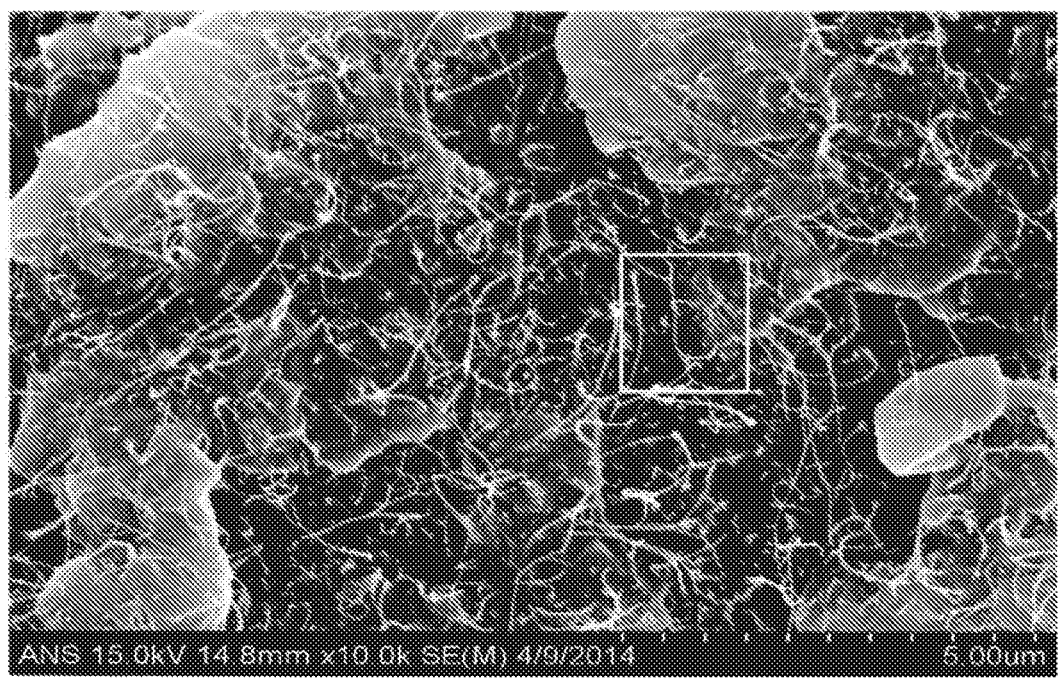
FIGS. 2C and 2D are SEM images of carbon nanostructures showing the presence of multiple branches.
Figure 2D:
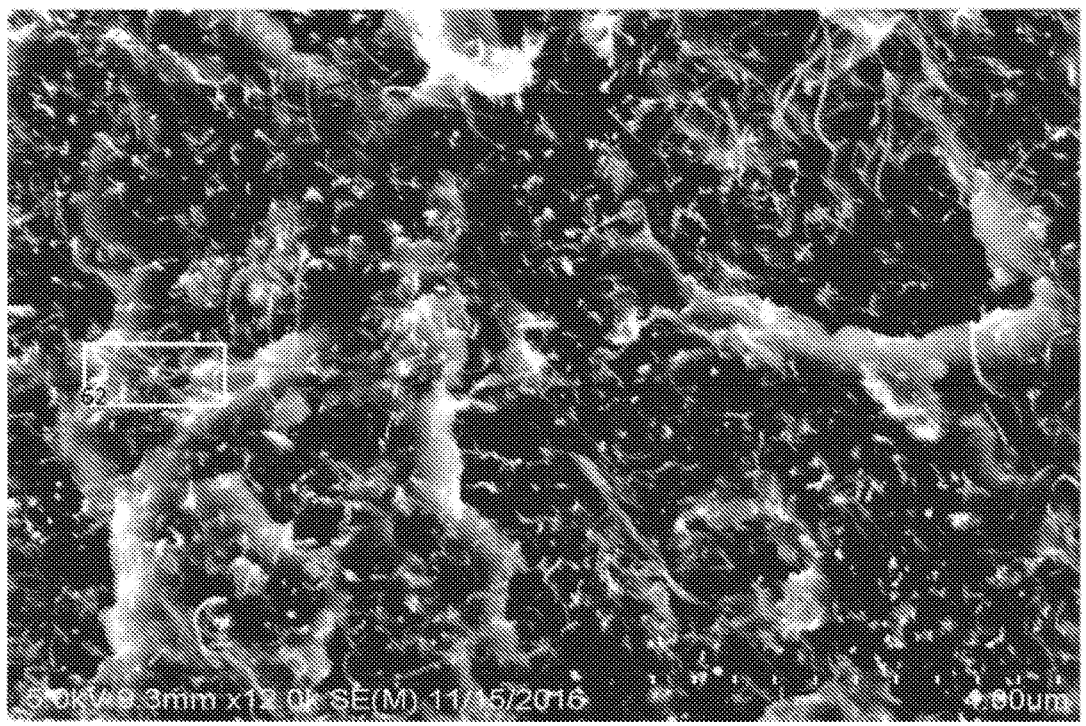
Figure 2E:
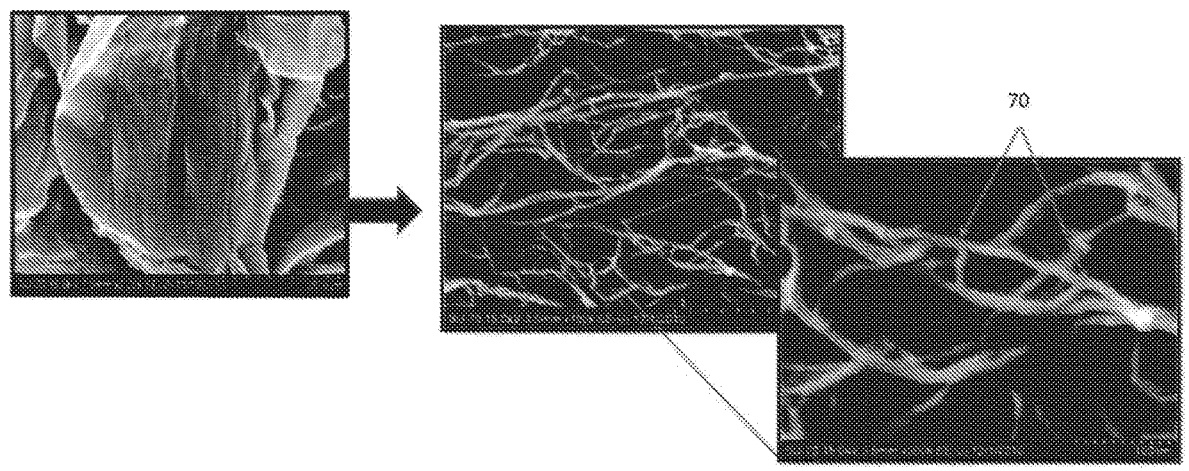
FIG. 2E is a high magnification SEM image that shows the entangled and branched nature of multiwall carbon nanotubes in CNS.

These features are highlighted in the TEM images of FIGS. 2A and 2B and SEM images of FIGS. 2C through 2E.

In more detail, the CNS branching in TEM region 40 of FIG. 2A shows the absence of any catalyst particle. In the TEM of FIG. 2B, first channel 50 and second channel 52 point to the asymmetry in the number of walls featured in branched CNSs, while arrow 54 points to a region displaying wall sharing. Multiple branches are seen in the SEM regions 60 and 62 of FIGS. 2C and 2D, respectively. SEM region 70 in FIG. 2E shows entangled and cross-linked carbon nanostructures One, more, or all these attributes can be encountered in the compositions (e.g., dispersions, slurries, pastes, solid or dried compositions, etc.), electrodes and/or batteries described herein.

In some embodiments, the CNS is present as part of an entangled and/or interlinked network of CNSs. Such an interlinked network can contain bridges between CNSs.

Suitable techniques for preparing CNSs are described, for example, in U.S. Patent Application Publication No. 2014/0093728 A1, published on Apr. 3, 2014, U.S. Pat. Nos. 8,784,937B2; 9,005,755B2; 9,107,292B2; and 9,447,259B2. The contents of these documents are incorporated herein by this reference in their entirety.

As described in these documents, a CNS can be grown on a suitable substrate, for example on a catalyst-treated fiber material. The product can be a fiber-containing CNS material. It is also possible to separate CNSs from the growth substrate upon which the carbon nanostructures are initially formed, thus generating CNS "flakes". CNS flakes can be further processed, e.g., by cutting or fluffing (operations that can involve mechanical ball milling, grinding, blending, etc.), chemical processes, or any combination thereof.

In some embodiments, the CNSs employed are "coated", also referred to herein as "sized" or "encapsulated" CNSs. In a typical sizing process, the coating is applied onto the CNTs that form the CNS. The sizing process can generate a partial or a complete coating that is non-covalently bonded to the CNTs and, in some cases, can act as a binder. In addition, or in the alternative, the size can be applied to already formed CNSs in a post-coating (or encapsulation) process. With sizes that have binding properties, CNSs can be formed into larger structures, granules or pellets, for example. In other embodiments the granules or pellets are formed independently of the function of the sizing.

Coating amounts can vary. For instance, relative to the overall weight of the coated CNS material, the coating can be within the range of from about 0.1 weight % to about 10 weight % (e.g., within the range, by weight, of from about 0.1% to about 0.5%; from about 0.5% to about 1%; from about 1% to about 1.5%; from about 1.5% to about 2%; from about 2% to about 2.5%; from about 2.5% to about 3%; from about 3% to about 3.5%; from about 3.5% to about 4%; from about 4% to about 4.5%; from about 4.5% to about 5%; from about 5% to about 5.5%; from about 5.5% to about 6%; from about 6% to about 6.5%; from about 6.5% to about 7%; from about 7% to about 7.5%; from about 7.5% to about 8%; from about 8% to about 8.5%; from about 8.5% to about 9%; from about 9% to about 9.5%; or from about 9.5% to about 10%; or from about 0.1 to about 9%; from about 0.1 to about 8%; from about 0.1 to about 7%; from about 0.1 to about 6%; from about 0.1 to about 5%; from about 0.1 to about 4%; from about 0.1 to about 3%; from about 0.1 to about 2%; from about 0.1 to about 1%; or from about 1 to about 9%; from about 1 to about 8%; from about 1 to about 7%; from about 1 to about 6%; from about 1 to about 5%; from about 1 to about 4%; from about 1 to about 3%; from about 1 to about 2%; or from about 2 to about 9%; from about 2 to about 8%; from about 2 to about 8%; from about 2 to about 7%; from about 2 to about 6%; from about 2 to about 5%; from about 2 to about 4%; from about 2 to about 3%; or from about 3 to about 9%; from about 3 to about 8%; from about 3 to about 7%; from about 3 to about 6%; from about 3 to about 5%; from about 3 to about 4%; or from about 4 to about 9%; from about 4 to about 8%; from about 4 to about 7%; from about 4 to about 6%; from about 4 to about 5%; or from about 5 to about 9%; from about 5 to about 8%; from about 5 to about 7%; from about 5 to about 6%; or from about 6 to about 9%; from about 6 to about 8%; or from about 6 to about 7%; or from about 7 to about 9% from about 7 to about 8%; or from about 8 to about 9%. Ranges within or ranges overlapping these ranges are possible as well.

In many cases, controlling the amount of coating (or size) reduces or minimizes undesirable effects on the properties of the CNS material itself. Low coating levels, for instance, are more likely to preserve electrical properties brought about by the incorporation of CNSs or CNS-derived (e.g., CNS fragments of fractured CNTs) materials in a cathode composition.

Various types of coatings can be selected. In many cases, sizing solutions commonly used in coating carbon fibers or glass fibers could also be utilized to coat CNSs. Specific examples of coating materials include but are not limited to fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders, such as poly(ethylene) oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. In many implementations, the CNSs used are treated with a polyurethane (PU), a thermoplastic polyurethane (TPU), or with polyethylene glycol (PEG).

Polymers such as, for instance, epoxy, polyester, vinylester, polyetherimide, polyetherketoneketone, polyphthalamide, polyetherketone, polyetheretherketone, polyimide, phenol-formaldehyde, bismaleimide, acrylonitrile-butadiene styrene (ABS), polycarbonate, polyethyleneimine, polyurethane, polyvinyl chloride, polystyrene, polyolefins, polypropylenes, polyethylenes, polytetrafluoroethylene, elastomers such as, for example, polyisoprene, polybutadiene, butyl rubber, nitrile rubber, ethylene-vinyl acetate polymers, silicone polymers, and fluorosilicone polymers, combinations thereof, or other polymers or polymeric blends can be employed in some cases, while conductive polymers such as, for instance, polyanilines, polypyrroles and polythiophenes can be used to enhance electrical conductivity.

Some implementations utilize coating materials that can assist in stabilizing a CNS dispersion in a solvent. In one example, the coating is selected to facilitate and/or stabilize dispersing CNSs in a medium that comprises, consists essentially of or consists of N-methylpyrrolidone (NMP), acetone, a suitable alcohol, water or any combination thereof. In another example, the coating material is the same as, similar to, or compatible with a dispersant or thickener employed when processing CNSs, in the making of battery electrodes, for instance.

Many embodiments described herein employ CNS-materials that have a 97% or higher CNT purity. Typically, anionic, cationic or metal impurities are very low, e.g., in the parts per million (ppm) range.

CNSs can be provided in the form of a loose particulate material (such as CNS flakes, granules, pellets, etc., for example) or in compositions that also include a liquid medium, e.g., dispersions, slurries, pastes, or in other forms.

Figure 3A:
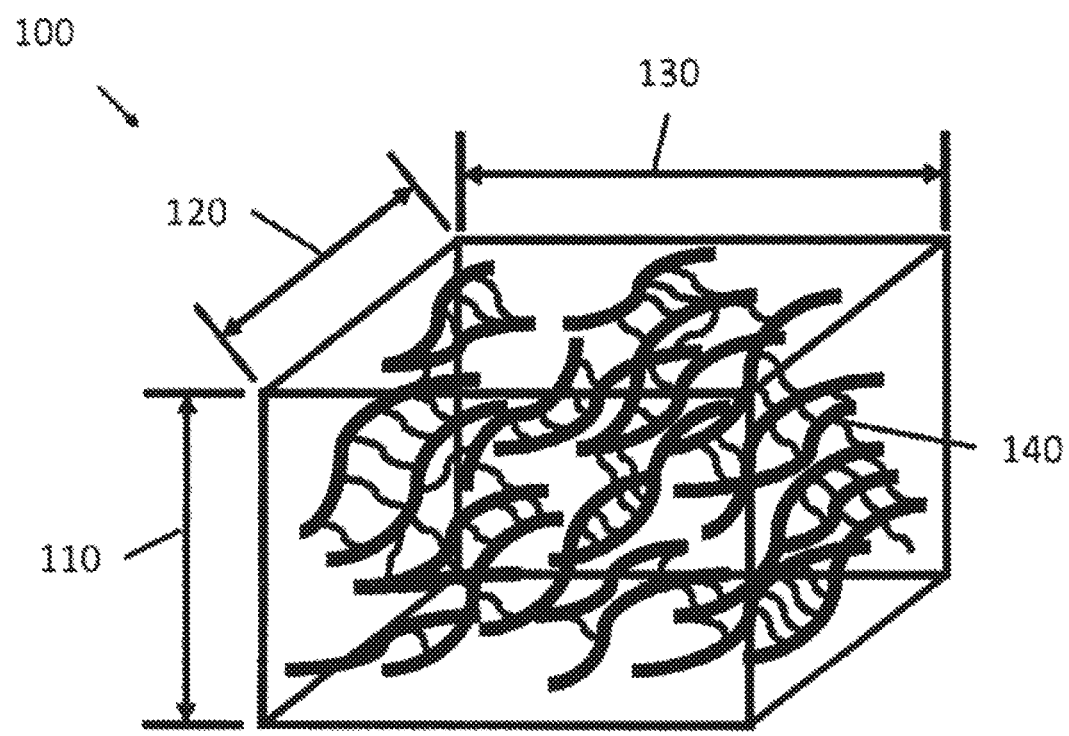
FIG. 3A is an illustrative depiction of a carbon nanostructure flake material after isolation of the carbon nanostructure from a growth substrate.

In many implementations, the CNSs are provided as flakes, free of any growth substrate. As used herein, the term "flake" or "flake material" refers to a discrete particle having finite dimensions. Shown in FIG. 3A, for instance, is an illustrative depiction of a CNS flake material after isolation of the CNS from a growth substrate. Flake structure 100 can have first dimension 110 that is in a range from about 1 nm to about 35 μm thick, particularly about 1 nm to about 500 nm thick, including any value in between and any fraction thereof. Flake structure 100 can have second dimension 120 that is in a range from about 1 micron to about 750 microns tall, including any value in between and any fraction thereof. Flake structure 100 can have third dimension 130 that can be in a range from about 1 micron to about 750 microns, including any value in between and any fraction thereof. Two or all of dimensions 110, 120 and 130 can be the same or different.

For example, in some embodiments, second dimension 120 and third dimension 130 can be, independently, on the order of about 1 micron to about 10 microns, or about 10 microns to about 100 microns, or about 100 microns to about 250 microns, from about 250 to about 500 microns, or from about 500 microns to about 750 microns.

The CNTs within the CNS can vary in length from between about 10 nanometers to about 750 microns, for example. In illustrative implementations, the CNTs are from about 10 nanometers to about 100 nanometers, from about 100 nanometers to about 500 nanometers, from about 500 nanometers to about 1 micron, from about 1 micron to about 10 microns, from about 10 microns to about 100 microns, from about 100 microns to about 250 microns, from about 250 to about 500 microns, or from about 500 microns to about 750 microns.

Figure 3B:
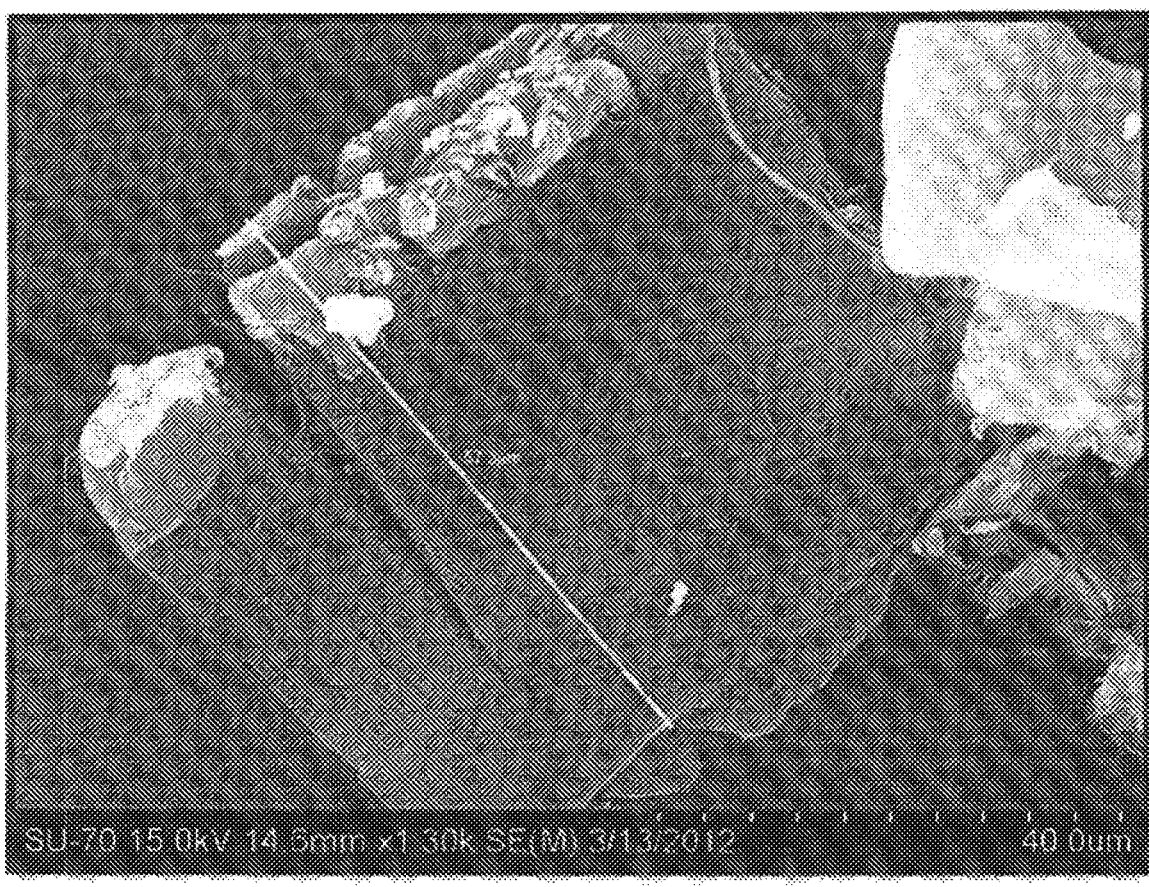
FIG. 3B is a SEM image of an illustrative carbon nanostructure obtained as a flake material.

Shown in FIG. 3B is a SEM image of an illustrative carbon nanostructure obtained as a flake material. The carbon nanostructure shown in FIG. 3B exists as a three-dimensional microstructure due to the entanglement and crosslinking of its highly aligned carbon nanotubes. The aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate. Without being bound by any theory or mechanism, it is believed that the rapid rate of carbon nanotube growth on the growth substrate can contribute, at least in part, to the complex structural morphology of the carbon nanostructure. In addition, the bulk density of the carbon nanostructure can be modulated to some degree by adjusting the carbon nanostructure growth conditions, e.g., by changing the concentration of transition metal nanoparticle catalyst particles that are disposed on the growth substrate to initiate carbon nanotube growth.

A flake structure can include a webbed network of carbon nanotubes in the form of a carbon nanotube polymer (i.e., a "carbon nanopolymer") having a molecular weight in a range from about 15,000 g/mol to about 150,000 g/mol, including all values in between and any fraction thereof. In some cases, the upper end of the molecular weight range can be even higher, including about 200,000 g/mol, about 500,000 g/mol, or about 1,000,000 g/mol. The higher molecular weights can be associated with carbon nanostructures that are dimensionally long. The molecular weight can also be a function of the predominant carbon nanotube diameter and number of carbon nanotube walls present within the carbon nanostructure. The crosslinking density of the carbon nanostructure can range between about 2 mol/cm$^3$ to about 80 mol/cm$^3$. Typically, the crosslinking density is a function of the carbon nanostructure growth density on the surface of the growth substrate, the carbon nanostructure growth conditions and so forth. It should be noted that the typical CNS structure, containing many, many CNTs held in an open web-like arrangement, removes Van der Wall's forces or diminishes their effect. This structure can be exfoliated more easily, which makes many additional steps of separating them or breaking them into branched structures unique and different from ordinary CNTs.

With a web-like morphology, carbon nanostructures can have relatively low bulk densities. As-produced, carbon nanostructures can have an initial bulk density ranging between about 0.003 g/cm$^3$ to about 0.015 g/cm$^3$. Further consolidation and/or coating to produce a carbon nanostructure flake material or like morphology can raise the bulk density to a range between about 0.1 g/cm$^3$ to about 0.15 g/cm$^3$. In some embodiments, optional further modification of the carbon nanostructure can be conducted to further alter the bulk density and/or another property of the carbon nanostructure. In some embodiments, the bulk density of the carbon nanostructure can be further modified by forming a coating on the carbon nanotubes of the carbon nanostructure and/or infiltrating the interior of the carbon nanostructure with various materials. Coating the carbon nanotubes and/or infiltrating the interior of the carbon nanostructure can further tailor the properties of the carbon nanostructure for use in various applications. Moreover, forming a coating on the carbon nanotubes can desirably facilitate the handling of the carbon nanostructure. Further compaction can raise the bulk density to an upper limit of about 1 g/cm$^3$, with chemical modifications to the carbon nanostructure raising the bulk density to an upper limit of about 1.2 g/cm$^3$.

In addition to the flakes described above, CNS materials can be provided as granules, pellets, or in other forms of loose particulate material, having a typical particle size within the range of from about 0.5 mm or 1 mm to about 1 cm, for example, from about 0.5 mm to about 1 mm, from about 1 mm to about 2 mm, from about 2 mm to about 3 mm, from about 3 mm to about 4 mm, from about 4 mm to about 5 mm, from about 5 mm to about 6 mm, from about 6 mm to about 7 mm, from about 7 mm to about 8 mm, from about 8 mm to about 9 mm or from about 9 mm to about 10 mm. In some implementations, the typical particle size is between about 1 mm to about 9 mm; about 1 mm and about 8 mm; about 1 mm and about 7 mm; about 1 mm and about 6 mm; about 1 mm and about 6 mm; about 1 mm and about 5 mm; about 1 mm and about 4 mm; about 1 mm and about 3 mm; about 2 mm and about 10 mm; about 2 mm and about 9 mm; about 2 mm and about 8 mm; about 2 mm and about 7 mm; about 2 mm and about 6 mm; about 2 mm and about 5 mm; about 2 mm and about 4 mm; or about 3 mm and about 10 mm; about 3 mm and about 9 mm; about 3 mm and about 8 mm; about 3 mm and about 7 mm; about 3 mm and about 6 mm; about 3 mm and about 5 mm; or about 4 mm and about 10 mm; about 4 mm and about 9 mm; about 4 mm and about 8 mm; about 4 mm and about 7 mm; about 4 mm and about 6 mm; or about 5 mm and about 10 mm; about 5 mm and about 9 mm; about 5 mm and about 8 mm; about 5 mm and about 7 mm; or about 6 mm and about 10 mm; about 6 mm and about 9 mm; about 6 mm and about 8 mm; or about 7 mm and about 10 mm; about 7 mm and about 9 mm; or about 8 mm and about 10 mm.

Bulk densities characterizing CNS materials that can be employed in practicing embodiments described herein can be within the range of from about 0.005 g/cm$^3$ to about 0.1 g/cm$^3$, e.g., from about 0.01 g/cm$^3$ to about 0.05 g/cm$^3$; or from about 0.005 to about 0.01; from about 0.005 to about 0.050; or from about 0.01 to about 0.05; or from about 0.01 to about 0.05 g/cm$^3$; or from about 0.01 to about 0.1 g/cm$^3$.

Commercially, examples of suitable CNS materials are those developed by Applied Nanostructured Solutions, LLC (ANS) (Massachusetts, United States).

The CNSs used herein can be identified and/or characterized by various techniques. Electron microscopy, including techniques such as transmission electron microscopy (TEM) and scanning electron microscopy (SEM), for example, can provide information about features such as the frequency of specific number of walls present, branching, the absence of catalyst particles, etc. See, e.g., FIGS. 2A-2E.

Raman spectroscopy can point to bands associated with impurities. For example, a D-band (around 1350 cm$^{-1}$) is associated with amorphous carbon; a G band (around 1580 cm$^{-1}$) is associated with crystalline graphite or CNTs). A G' band (around 2700 cm$^{-1}$) is expected to occur at about 2×the frequency of the D band. In some cases, it may be possible to discriminate between CNS and CNT structures by thermogravimetric analysis (TGA).

In some embodiments, the CNSs are utilized in conjunction with another conductive carbon additive, e.g., CB and/or individualized, pristine CNTs, i.e., CNTs that are not derived or generated from CNSs, during process operations, for example.

In many cases, the CB particles employed have a Brunauer-Emmett-Teller (BET) surface area no greater than about 200, 180, 160, 140, 120, 100, 80, 60 or 50 m$^2$/g. In specific examples, the CB particles have a BET that is within the range of from about 200 to about 180 m$^2$/g; from about 200 to about 160 m$^2$/g; 200 to about 140 m$^2$/g; from about 200 to about 120 m$^2$/g; from about 200 to about 100 m$^2$/g, from about 200 to about 80 m$^2$/g; from about 200 to about 60 m$^2$/g; from about 200 to about 50 m$^2$/g; or from about 180 to about 160 m$^2$/g; from about 180 to about 140 m$^2$/g; from about 180 to about 120 m$^2$/g; from about 180 to about 100 m$^2$/g, from about 180 to about 80 m$^2$/g; from about 180 to about 60 m$^2$/g; from about 180 to about 50 m$^2$/g; or from about 160 to about 140 m$^2$/g; from about 160 to about 120 m$^2$/g; from about 160 to about 100 m$^2$/g, from 160 to about 80 m$^2$/g; from about 160 to about 60 m$^2$/g; from 160 to about 50 m$^2$/g; or from about 140 to about 120 m$^2$/g; or from about 140 to about 100 m$^2$/g, from 140 to about 80 m$^2$/g; from about 140 to about 60 m$^2$/g; from 140 to about 50 m$^2$/g; or from about 120 to about 100 m$^2$/g, from 120 to about 80 m$^2$/g; from about 120 to about 60 m$^2$/g; from 120 to about 50 m$^2$/g; or from about 100 to about 80 m$^2$/g; from about 100 to about 60 m$^2$/g; from 100 to about 50 m$^2$/g; or from about 80 to about 60 m$^2$/g; from 80 to about 50 m$^2$/g; or from about 60 to about 50 m$^2$/g. All BET surface area values disclosed herein refer to "BET nitrogen surface area" and are determined by ASTM D 6556-10, the entirety of which is incorporated herein by reference.

Suitable CBs can have an oil adsorption number (OAN) of at least 130 mL/100 g, 140, 150, 160, 170, 180, 190, 200, 210, 220, 230, 240 or 250 mL/100 g. Exemplary CBs have an OAN within the range of from about 130 to about 150 mL/100 g; from about 130 to about 170 mL/100 g; from about 130 to about 190 mL/100 g; from about 130 to about 210 mL/100 g; from about 130 to about 230 mL/100 g; from 130 to about 250 mL/100 g or higher; or from about 150 to about 170 from about 150 to about 190; from about 150 to about 210; from about 150 to about 230 mL/100 g; from about 150 to about 250 mL/100 g or higher; or from 170 to about 190 mL/100 g; from about 170 to about 210; from about 170 to about 230 mL/100 g; from about 170 to about 250 mL/100 g or higher; or from about 190 to about 210 mL/100 g; from about 190 to about 230 mL/100 g; from about 190 to about 250 mL/100 g or higher; or from about 210 to about 230 mL/100 g; from about 210 to about 250 mL/100 g or higher; or from about 230 to about 250 mL/100 g or higher. All OAN values cited herein are determined by the method described in ASTM D 2414-16, which is incorporated herein by reference.

Carbon black particles also can be characterized by their statistical thickness surface areas (STSAs), a property that can be determined by ASTM D 6556-10. For a given carbon black, it may also be of interest, in some cases, to specify the ratio of its STSA to its BET surface area (STSA:BET ratio). For the purpose of this application, the STSA:BET ratio for carbon black particles can be within the range of about 0.3 to about 1.

Crystalline domains can be characterized by an $L_a$ crystallite size, as determined by Raman spectroscopy. $L_a$ is defined as 43.5×(area of G band/area of D band). The crystallite size can give an indication of the degree of graphitization, where a higher $L_a$ value correlates with a higher degree of graphitization. Raman measurements of $L_a$ were based on Gruber et al., "Raman studies of heat-treated carbon blacks," *Carbon* Vol. 32 (7), pp. 1377-1382, 1994, which is incorporated herein by reference. The Raman spectrum of carbon includes two major "resonance" bands at about 1340 cm$^{-1}$ and 1580 cm$^{-1}$, denoted as the "D" and "G" bands, respectively. It is generally considered that the D band is attributed to disordered sp$^2$ carbon, and the G band to graphitic or "ordered" sp$^2$ carbon. Using an empirical approach, the ratio of the G/D bands and an $L_a$ measured by X-ray diffraction (XRD) are highly correlated, and regression analysis gives the empirical relationship:

$$L_a = 43.5 \times (\text{area of G band/area of D band}),$$

in which $L_a$ is calculated in Angstroms. Thus, a higher $L_a$ value corresponds to a more ordered crystalline structure.

In some embodiments, the carbon black has an $L_a$ crystallite size of less than or equal to 35 Å, for example, from 25 Å to 35 Å. The $L_a$ crystallite size can have or include, for example, one of the following ranges: from 25 to 33 Å, or from 25 to 31 Å, or from 25 to 29 Å, or from 25 to 27 Å, or from 27 to 35 Å, or from 27 to 33 Å, or from 27 to 31 Å, or from 27 to 29 Å, or from 29 to 35 Å, or from 29 to 33 Å, or from 29 to 31 Å, or from 31 to 35 Å, or from 31 to 33 Å, or from 33 to 35 Å. In certain embodiments, the $L_a$ crystallite size can be less than or equal to 33 Å, or less than or equal to 31 Å, or less than or equal to 29 Å, or less than or equal to 27 Å.

The crystalline domains can be characterized by an $L_c$ crystallite size. The $L_c$ crystallite size was determined by X-ray diffraction using an X-ray diffractometer (PANalytical X'Pert Pro, PANalytical B.V.), with a copper tube, tube voltage of 45 kV, and a tube current of 40 mA. A sample of carbon black particles was packed into a sample holder (an accessory of the diffractometer), and measurement was performed over angle (2θ) range of 10° to 80°, at a speed of 0.14°/min. Peak positions and full width at half maximum values were calculated by means of the software of the diffractometer. For measuring-angle calibration, lanthanum hexaboride (LaB$_6$) was used as an X-ray standard. From the measurements obtained, the $L_c$ crystallite size was determined using the Scherrer equation: $L_c(\text{Å}) = K \ast \lambda / (\beta \ast \cos\theta)$, where K is the shape factor constant (0.9); λ is the wavelength of the characteristic X-ray line of Cu K$_{\alpha 1}$ (1.54056 Å); β is the peak width at half maximum in radians; and θ is determined by taking half of the measuring angle peak position (2θ).

In some embodiments, the carbon black has an $L_c$ crystallite size of less than or equal to 27 Å, for example, from 15 Å to 27 Å. The $L_c$ crystallite size can have or include, for example, one of the following ranges: from 15 to 25 Å, or from 15 to 23 Å, or from 15 to 21 Å, or from 15 to 19 Å, or from 15 to 17 Å, or from 17 to 27 Å, or from 17 to 25 Å, or from 17 to 23 Å, or from 17 to 21 Å, or from 17 to 19 Å, or from 19 to 27 Å, or from 19 to 25 Å, or from 19 to 23 Å, or from 19 to 21 Å, or from 21 to 27 Å, or from 21 to 25 Å, or from 21 to 23 Å, or from 23 to 27 Å, or from 23 to 25 Å, or from 25 to 27 Å. In certain embodiments, the $L_c$ crystallite size can be less than or equal to 25 Å, or less than or equal to 23 Å, or less than or equal to 21 Å, or less than or equal to 19 Å, or less than or equal to 17 Å.

The carbon black particles can have a high degree of graphitization, as indicated by a high % crystallinity, which is obtained from Raman measurements as a ratio of the area of the G band and the areas of G and D bands ($I_G/I_{G+D}$). In certain embodiments, the carbon black particles have % crystallinities ($I_G/I_{G+D}$) ranging from about 25% to about 45%, as determined by Raman spectroscopy. The % crystallinity ($I_G/I_{G+D}$) can have or include, for example, one of the following ranges: from 25% to 43%, from 25% to 41%, from 25% to 37%, from 25% to 39%, from 25% to 35%, from 25% to 30%, from 25% to 28%; or from 30% to 45%, from 30% to 43%, from 30% to 39%, from 30% to 35%; or from 35% to 45%, from 35% to 41%, from 35% to 39%; or from 37% to 45%, from 37% to 43%, from 37% to 41%; or from 39% to 45%, from 39% to 43%; or from 41% to 45%, or from 41% to 43%.

Some CB specifications characterized by these and/or other properties known and recognized by those skilled in the art are shown as specifications I-VI in Table 1.

TABLE 1

| CB Specification | BET SA, m²/g | STSA, m²/g | OAN, mL/100 g | $L_a$ Raman Å | ($I_G/(I_G + I_D)$) % Raman | $L_c$ XRD Å |
|---|---|---|---|---|---|---|
| I | 154 | 135 | 161 | 31 | 42 | 21 |
| II | 169 | 144 | 155 | 24 | 38 | 19 |
| III | 100 | 100 | 250 | 27 | 39 | 21 |
| IV | 58 | 58 | 200 | 28 | 39 | 20 |
| V | 390 | 145 | 170 | 19 | 30 | 14 |
| VI | 55 | 55 | 140 | 17 | 28 | 15 |

Suitable CB particles that can be utilized can be commercially-available particles. Examples include LITX® 50, LITX® 66, LITX® 200, LITX® 300 and LITX® HP carbon black particles available from Cabot Corporation; C-NERGY™ C45, C-NERGY™ C65 and SUPER P® products from Imerys; Li-400, Li-250, Li-100 and Li-435 products from Denka; and the EC300 product from Ketjen.

Another material that could be used in conjunction with CNSs is illustrated by specification VII-IX (Table 2, below) describing exemplary CNTs.

TABLE 2

| CB Specification | BET SA, m²/g | STSA, m²/g | OAN, mL/100 g | $L_a$ Raman Å | ($I_G/(I_G + I_D)$) % Cr, Raman | $L_c$ XRD Å |
|---|---|---|---|---|---|---|
| VII | 230 | N/A | N/A | 52.5 | 55 | 45 |
| VIII | 170 | N/A | N/A | 30 | 40 | 41 |
| IX | 191 | N/A | N/A | 56 | 55 | 31 |

Values presented in Table 2 are typically determined using the techniques described above with respect to CB.

In some implementations, CNSs or combinations of CNSs and another CCA such as CB are provided in the presence of a liquid medium.

In general, the liquid medium can be any liquid, a solvent, for instance, that is suitable for use with the constituents of the compositions described herein and capable of being utilized to manufacture the intended electrode. The solvent can be anhydrous, polar and/or aprotic. In some embodiments, the solvent has a high volatility so that, during manufacturing, it can be easily removed (e.g., evaporated), thereby reducing drying time and production costs. Suitable examples include but are not limited to N-methylpyrrolidone (NMP), acetone, a suitable alcohol, water or any combination thereof.

The composition can further include one or more dispersant(s) (e.g., a cellulosic dispersant), and/or one or more additives, typically electrically non-conductive additives, such as a maleic anhydride polymer, for example.

Examples of suitable dispersants that can be used in conjunction with a CCA that contains CNSs and CB, include poly(vinyl pyrrolidone), poly(vinylpyrrolidone-co-vinyl acetate), poly(vinyl butyral), poly(vinyl alcohol), poly(ethylene oxide), poly(propylene oxide), poly(propylene carbonate), cellulosic dispersants such as methyl cellulose, carboxymethyl cellulose, ethyl cellulose, hydroxymethyl cellulose and hydroxypropyl cellulose; poly(carboxylic acid) such as poly (acrylic acid), polyacrylate, poly(methylacrylate), poly(acrylamide), amide wax, styrene maleic anhydride resins, octylphenol ethoxylate and others known in the art. Various dispersants are described in U.S. patent application Ser. No. 16/420,684, filed on May 23, 2019, entitled "Compositions Useful for Producing Electrodes and Related Methods", hereby incorporated by [Dispersants are described in U.S. Ser. No. 16/420,684, filed on May 23, 2019, entitled "Compositions Useful for Producing Electrodes and Related Methods", hereby incorporated by this reference. More than one type of dispersant can be employed. In some of the embodiments that employ encapsulated CNSs, the dispersant is a material that is the same, similar or compatible with the material coating the CNSs.

The concentration of the dispersant can vary, depending on the dispersant used, the specific type(s) and concentrations of CNSs and/or CB, the amount of polymer, if present, solvent content, etc. For many embodiments, the concentration of the dispersant can be expressed as a ratio of the dispersant to the CCA material (CB and CNSs, for instance), by weight. This dispersant to CCA weight ratio can range from 3:100 to 200:100 and can have or include, for example, one of the following ranges: 3:100 to 0:100, or 3:100 to 30:100, or 3:100 to 20:100, or 3:100 to 10:100, or 10:100 to 50:100, or 10:100 to 40:100, or 10:100 to 30:100, or 10:100 to 20:100, or 20:100 to 50:100, or 20:100 to 40:100, or 20:100 to 30:100, or 30:100 to 50:100, or 30:100 to 40:100, or 40:100 to 50:100 or 60:100; or 80:100; or 100:100; or 120 to 100; or 140:100; or160:100 or 180:100. In specific examples, the dispersant to CCA ratio is within the range of from 10:100 to 200:100; or 30:100 to 200:100; or 50:100 to 200:100; or 70:100 to 200:100; or 90:100 to 200:100; or 110:100 to 200:100; or 130:100 to 200:100; or 150:100 to 200:100; or 170:100 to 200:100; or 190:100 to 200:100.

Dispersions can be prepared by a suitable mixing technique, using, for example, conventional mixing equipment. In specific embodiments, two or more constituents are blended to form a solution or dispersion, for example.

This resulting formulation can be characterized, for instance, by a concentration of CNS in the solvent of from about 0.2 to about 5 weight %, e.g., from about 0.2 to about 0.5; from about 0.2 to about 1.0; from about 0.2 to about 1.5; from about 0.2 to about 2.0; from about 0.2 to about 2.5; from about 0.2 to about 3.0; from about 0.2 to about 3.5; from about 0.2 to about 4.0; from about 0.2 to about 4.5 wt %; or from about 0.5 to about 1.0; from about 0.5 to about 1.5; from about 0.5 to about 2.0; from about 0.5 to about 2.5; from about 0.5 to about 3.0; from about 0.5 to about 3.5; from about 0.5 to about 4.0; from about 0.5 to about 4.5; from about 0.5 to about 5 wt %; or from about 1.0 to about 1.5; from about 1.0 to about 2.0; from about 1.0 to about 2.5; from about 1.0 to about 2.5; from about 1.0 to about 3.0; from about 1.0 to about 3.5; from about 1.0 to about 4.0; from about 1.0 to about 4.5; from about 1 to about 5.0 wt %; or from about 1.5 to about 2.0; from about 1.5 to about 2.5; from about 1.5 to about 3.0; from about 1.5 to about 3.5; from about 1.5 to about 4.0; from about 1.5 to about 4.5; from about 1.5 to about 5.0 wt %; or from about 2.0 to about 2.5; or from about 2.0 to about 3.0; from about 2.0 to about 3.5; from about 2.0 to about 4.0 from about 2.0 to about 4.5; from about 2.0 to about 5.0 wt %; or from about 2.5 to about 3.0; from about 2.5 to about 3.5; from about 2.5 to about 4.0 from about 2.5 to about 4.5; from about 2.5 to about 5.0 wt %; or from about 3.0 to about 4.0 from about 3.0 to about 4.5; from about 3.0 to about 5.0 wt %; or from about 3.5 to about 4.0; from about 3.5 to about 4.5; from about 3.5 to about 5.0 wt %; or from about 4.0 to about 4.5; from about 4.0 to about 5.0 wt %; or from about 4.5 to about 5.0 wt %. Ranges that overlap or are within these ranges also can be selected.

CB can be present in concentrations within the range of from about 0 to about 5 wt %, such as, for example within the range of from about 0 to about 4. 5; from about 0 to about 4; from about 0 to about 3.5; from about 0 to about 3; from about 0 to about 2.5; from about 0 to about 2; from about 0 to about 1.5 or from about 0 to about 1; or from about 0.5 to about 5; from about 0.5 to about 4. 5; from about 0.5 to about 4; from about 0.5 to about 3.5; from about 0.5 to about 3; from about 0.5 to about 2.5; from about 0.5 to about 2; from about 0.5 to about 1.5 or from about 0.5 to about 1 wt %; or from about 1 to about 5; from about 1 to about 4.5; from about 1 to about 4; from about 1 to about 3.5; from about 1 to about 3; from about 1 to about 2.5; from about 1 to about 2; from about 1 to about 1.5 wt %; or from about 1.5 to about 5; from about 1.5 to about 4.5; from about 1.5 to about 4.0; from about 1.5 to about 3.5; from about 1.5 to about 3; from about 1.5 to about 2.5 or from about 1.5 to about 2 wt %; or from about 2 to about 5; from about 2 to about 4.5; from about 2 to about 4; from about 2 to about 3.5; from about 2 to about 3; from about 2 to about 2.5 wt %; or from about 2.5 to about 5; from about 2.5 to about 4.5; from about 2.5 to about 4; from about 2.5 to about 3.5; from about 2.5 to about 3 wt %; or from 3 to about 5; from about 3 to about 4.5; from about 3 to about 4; from about 3 to about 3.5 wt %; or from about 3.5 to about 5; from about 3.5 to about 4.5; from about 3.5 to about 4 wt %; or from about 4 to about 5; from about 4 to about 4.5 wt %; or from about 4.5 to about 5 wt %.

Concentrations of a CCA that includes both CB and CNSs can be present within a range of from about 0.2 wt % to about 10 wt % such as, for instance 0.5 to 10; 0.5 to 9; 0.5 to 8; 0.5 to 7; 0.5 to 6; 0.5 to 5; 0.5 to 4; 0.5 to 3; 0.5 to 2; 0.5 to 1 wt %; or from 1 to 10; from 1 to 9; from 1 to 8; from 1 to 7; from 1 to 6; from 1 to 5; from 1 to 4; from 1 to 3; from 1 to 2 wt %; or from 2 to 10; from 2 to 9; from 2 to 8; from 2 to 7; from 2 to 6; from 2 to 5; from 2 to 4; from 2 to 3 wt %; or from 3 to 10; from 3 to 9; from 3 to 8; from 3 to 7; from 3 to 6; from 3 to 5; from 3 to 4 wt %; or from 4 to 10; from 4 to 9; from 4 to 8; from 4 to 7; from 4 to 6; from 4 to 5 wt %; or from 5 to 10; from 5 to 9; from 5 to 8; from 5 to 7; from 5 to 6 wt %; or from 6 to 10; from 6 to 9; from 6 to 8; from 6 to 7 wt %; of from 7 to 10; 7 to 9; 7 to 8 wt %; or from 8 to 10; from 8 to 9 wt % or from 9 to 10 wt %.

In some cases, techniques used to prepare the dispersion generate CNS-derived species such as "CNS fragments" and/or "fractured CNTs" that become distributed (e.g., homogeneously) in individualized form throughout the dispersion. Except for their reduced sizes, CNS fragments (a term that also includes partially fragmented CNSs) generally share the properties of intact CNS and can be identified by electron microscopy and other techniques, as described above. Fractured CNTs can be formed when crosslinks between CNTs within the CNS are broken, under applied shear, for example. Derived (generated or prepared) from CNSs, fractured CNTs are branched and share common walls with one another.

Unlike ordinary solutions or dispersions that use ordinary, individualized CNTs, e.g., in pristine form, CNSs, in particular when provided as post-coated CNSs in the form of granules or pellets, can yield stable dispersions. In some embodiments, stable dispersions can be achieved in the absence of stabilizing surfactants, even with water as solvent. Other embodiments utilize a solvent in combination with water during wet processing. Examples of solvents that can be used include, but are not limited to, isopropanol (IPA), ethanol, methanol, and water.

While the unique attributes of CNS materials are expected to bring about many benefits for certain applications, such as the fabrication of anodes that contain a silicon phase (e.g., Si or $SiO_x$), these same attributes can pose significant challenges, especially in the context of the water-based processes currently employed to manufacture anodes for LIBs. Indeed, a crosslinked network of branched, long length CNTs in the CNS can impact dispersibility and increase the viscosity when processing CNSs in an aqueous graphite slurry. The rather hydrophobic character of CNSs raises yet other difficulties for water-based applications.

Thus, in some of its aspects, the invention relates to identifying and developing materials and methods that can be integrated with existing manufacturing processes, while fully realizing the performance advantages brought about by the unique properties characterizing CNS materials. In specific embodiments, the invention relates to approaches that overcome at least some of the obstacles discussed above and are particularly suitable in manufacturing silicon-containing anodes such as, for instance, anodes that include graphite-Si or graphite-$SiO_x$.

To address hydrophobicity in the context of water-based anode fabrication processes, these compositions can include surface active agents, wetting agents, rheology modifiers, e.g., thickeners, defoamers and/or other components. One illustration relates to an aqueous dispersion prepared using CNSs, e.g., encapsulated CNSs, optionally in combination with CB, and a "dispersant", also referred to herein as a "dispersing agent", i.e., a non-surface active or a surface-active substance, e.g., a polymeric compound, that is added to a suspension, a colloid, for instance, to improve the separation of particles and to prevent settling or clumping. More than one dispersant can be employed.

Aqueous dispersions described herein can also include a thickener. The enhanced viscosity afforded by a thickener is often necessary in order to reduce flow and to maintain an active agent on a substrate. Typically, the increased viscosity provided by thickeners may range from a slight thickening in moderately flowable systems to generally immobile systems such as gels. Some known thickeners are pseudoplastic so that an aqueous composition containing the thickener may be blended with other ingredients by agitation. Many suitable thickeners can be obtained commercially. Examples include but are not limited to carboxymethylcellulose, carboxymethylcellulose sodium solution, gum arabic, agar, xanthan gum, starch and modified starch.

In some cases, the thickener is the dispersing agent. In other cases, the thickener is used in addition to the dispersant. For convenience, as used herein, the scope of the term "dispersant" includes compounds that may be primarily thought of as dispersants, as well as compounds that may be primarily thought of as thickeners. The common feature is their ability to make stable dispersions comprising of CNSs or CNSs with CB.

In addition to the dispersant, some of the dispersions described herein will contain at least one other component such as, for instance, a defoamer. Other ingredients, e.g., wetting agents can be included.

In many cases, the dispersion is prepared by combining the dispersant, CNS particles (e.g., having a particle size no greater than about 40 microns (μm), preferably no greater than about 30 microns, most preferably no greater than about 20 microns within the range of from about 0.1 microns to about 20 microns, for example) and, optionally, carbon black. Exemplary CNS particle sizes are within the range of from 0.1 to 18; 0.1 to 16; 0.1 to 14; 0.1 to 12; 0.1 to 10; 0.1 to 8; 0.1 to 6; 0.1 to 5; 0.1 to 4; 0.1 to 3; 0.1 to 2 or 0.1 to 1 μm; or from 1 to 20; from 1 to 18; 1 to 16; 1 to 14; 1 to 12; 1 to 10; 1 to 8; 1 to 6; 1 to 4; 1 to 2 μm; or from 2 to 20; from 2 to 18; from 2 to 16; from 2 to 14; from 2 to 12; from 2 to 10; from 2 to 8; from 2 to 6; from 2 to 4 μm; or from 4 to 20; from 4 to 18; from 4 to 16; from 4 to 14; from 4 to 12; from 4 to 10; from 4 to 8; from 4 to 6 μm; or from 6 to 20; from 6 to 18; from 6 to 16; from 6 to 14; from 6 to 12; from 6 to 10; from 6 to 8 μm; or from 8 to 20; from 8 to 18; from 8 to 16; from 8 to 12; from 8 to 10 μm; or from 10 to 20; from 10 to 18; from 10 to 16; from 10 to 14; from 10 to 12 μm; or from 12 to 20; from 12 to 18; from 12 to 16; from 12 to 14 μm; or from 14 to 20; from 14 to 18; from 14 to 16 μm; or from 16 to 20; 16 to 18 μm; or from 18 to 20 μm. Ranges within or overlapping these ranges are possible as well.

In many implementations, the CNSs used are encapsulated, having a coating selected from the group consisting of carboxymethylcellulose, various cellulose-derivatives, polyvinyl-alcohol, polyvinyl pyrrolidone, polyethylene glycol or polyurethane. In some cases, the dispersant can be a material that is the same or similar to the coating material of the encapsulated CNSs.

Suitable dispersions can be characterized by one, more or all of the following properties: CCA loading; fineness of grind; viscosity; dispersion stability; electrochemical stability (within a certain voltage range); and maintaining good electrical conductivity of the CCA.

In some implementations, the CCA present in the dispersion is entirely derived from carbon nanostructures and could include carbon nanostructures, fragments of carbon nanostructures and fractured carbon nanotubes. In other implementations, the CCA present in the dispersion is entirely derived from a combination (blend) of carbon black and carbon nanostructures that could include: (a) carbon black and (b) carbon nanostructures, fragments of carbon nanostructures and fractured carbon nanotubes. If used, the carbon black can include one or more CB type(s) or specification(s). Further implementations include a CCA derived from CNSs and pristine CNTs, i.e., CNTs that are not derived from CNSs.

In many cases, the CCA loading in the dispersion is no greater than 1 weight %, often no greater than about 0.9, 0.8, 0.7, 0.6, 0.5, 0.4, 0.3, 0.2 or 0.1 weight %. For instance, the CCA loading can be within a range of from 0.1 to 1.0; from 0.1 to 0.9; from 0.1 to 0.8; from 0.1 to 0.7; from 0.1 to 0.6; from 0.1 to 0.5 wt %; from 0.1 to 0.4; from 0.1 to 0.3; from 0.1 to 0.2 wt %; or from 0.2 to 1.0; from 0.2 to 1.0; from 0.2 to 0.9; from 0.2 to 0.8; from 0.2 to 0.7; from 0.2 to 0.6; from 0.2 to 0.5; from 0.2 to 0.4; from 0.2 to 0.3 wt %; or from 0.3 to 1.0; from 0.3 to 0.9; from 0.3 to 0.8; from 0.3 to 0.7; from 0.3 to 0.6; from 0.3 to 0.5; from 0.3 to 0.4 wt %; or from 0.4 to 1.0; from 0.4 to 0.9; from 0.4 to 0.8 wt % or from 0.4 to 0.7; from 0.4 to 0.6; from 0.4 to 0.5 wt %; or from 0.5 to 1.0; from 0.5 to 0.9; from 0.5 to 0.8; from 0.5 to 0.7; from 0.5 to 0.6 wt %; or from 0.6 to 1.0; from 0.6 to 0.9; from 0.6 to 0.8; from 0.6 to 0.7 wt % or from 0.6 to 1.0; from 0.6 to 0.9; from 0.6 to 0.8; from 0.6 to 0.7 wt %; or from 0.7 to 1.0; from 0.7 to 0.9; from 0.7 to 0.8 wt %; or from 0.8 to 1.0; from 0.8 to 0.9 wt %; or from 0.9 to 1.0 wt %. Ranges within or overlapping these ranges also can be employed.

Typically measured using a "Hegman" or "grind" gauge, the fineness of grind can provide information about the actual size of the individual dispersed solid particles, the degree to which particles are dispersed and/or the presence of agglomerates or coarse particles. Fineness of grind values can be expressed as μm, mils (0.001 inch) or according to the Hegman scale or National Standard (NS) scale (ranging from 0 to 8, with numbers increasing as the particle size decreases. An applicable technique for measuring fineness of grind is presented in ASTM D1210-05(2014), with the title *Standard Test Method for Fineness of Dispersion of Pigment-Vehicle Systems by Hegman-Type Gage.*

In specific embodiments, the dispersion has a fineness of grind that is no greater than about 20 μm, for instance no greater than 18, 15, 12, 10, 8, 5, e.g., no greater than 10. In some implementations, the fineness of grind is within a range of from 6 to 20; from 6 to 18; from 6 to 16; from 6 to 14; from 6 to 12; from 6 to 10; from 6 to 8 μm; or from 8 to 20; from 8 to 18; from 8 to 16; from 8 to 14; from 8 to 12; from 8 to 10 μm; or from 10 to 20; from 10 to 18; from 10 to 16; from 10 to 14; from 10 to 12 μm; or from 12 to 20; from 12 to 18; from 12 to 16; from 12 to 14 μm; or from 14 to 20; from 14 to 18; from 14 to 16 μm; or from 16 to 20; from 16 to 18 μm; or from 18 to 20 μm. Also possible are ranges within or overlapping these ranges.

Another important property of the dispersion is its viscosity. In many cases, the viscosity of a suitable dispersion (in Pascal x second or Pa·s, at a shear rate of 10 s$^{-1}$) is no greater than 5, often no greater than 4, 3, 2, 1, or 0.5 Pa·s. Exemplary viscosities at a shear rate of 10 s$^{-1}$ can be within the range of from 5 to 0.5; from 5 to 1; from 5 to 2; from 5 to 3; from 5 to 4 Pa·s; or from 4 to 0.5; from 4 to 1; from 4 to 2; from 4 to 3 Pa·s; or from 3 to 0.5; from 3 to 1; from 3 to 2 Pa·s; or from 2 to 0.5; from 2 to 1 Pa·s; or 1 to 0.5 Pa·s. Other ranges, such as, for instance, ranges overlapping or ranges within the above-mentioned ranges also can be utilized. The viscosity was measured by a rheometer (model AR 2000, TA instrument) and 40 mm serrated steel plate geometry at shear rate of 10 s$^{-1}$.

Dispersions that are premade and intended for distribution, storage and/or remote use, e.g., at a battery manufacturing facility, can be further characterized by their stability, a term that refers to maintaining the integrity of the dispersion and resisting sedimentation, particle aggregation and the like. In illustrative examples, the time period for which the dispersed phase particles will remain suspended is at least 4 weeks, often more than 8 weeks, 3 months or 6 months.

While dispersant properties can be important in preparing a dispersion with suitable rheology, dispersion stability and fineness of the grind, its presence in an electrochemical cell is often considered undesirable since it may lead to parasitic reactions. Electrochemically active dispersants can undergo redox reaction at the electrode(s), which may result in lower columbic efficiency, gassing and other issues. Thus, electrochemical stability is another property that can relate back to the dispersion employed when fabricating electrodes and/or batteries and can be assessed by cyclic voltammetry. Preferred dispersants and dispersions will be stable in a wide electrochemical window that is consistent with the operational voltage window for anode (typically 0-2.5 V vs Li$^+$/Li). Most preferred, the preferred dispersants and dispersions will be stable in the voltage window that coincides with the voltage range determined by the chemistry of the electrochemical cell.

Preparing a CNS-containing dispersion that meets constraints such as, for instance, those pertaining to the manufacture of LIB anodes and, in particular, graphite-Si or graphite SiO$_x$ anodes, may entail procedures designed to find dispersants that will promote some, most and preferably all the attributes described above. Thus, in some embodiments, the invention relates to a process for investigating compounds, and in particular dispersants, suitable for preparing CCA aqueous formulations in which the CCA comprises, consists essentially of or consists of a CNS material, supplied, for example, in the form of flakes, granules or pellets. In some implementations the CCA comprises, consists essentially of or consists of CNS and CB. The dispersant can be custom-designed or a commercially available formulation.

A method for determining whether a particular dispersant can be a potential candidate for CNSs-containing compositions for anode applications can include various tests. If conducted in a step-wise order, these tests can help narrow down the field, eliminating some possibilities and promoting fewer candidates to a subsequent evaluation. A non-limiting example, illustrating several steps that can be conducted to identify and/or develop formulations that contain CNSs and are suitable for Si-containing anode applications, is described below.

The dispersant to be investigated is initially selected based on criteria such as, for instance, its known properties, e.g., with respect to aqueous applications, in particular aqueous applications pertaining to CNTs, other known CCA materials, etc. The following references can be used to learn more about various dispersants for carbon nanomaterials in aqueous formulations: (i) *Dispersing carbon nanotubes using surfactants*, by Wang, H. Current Opinion in Colloid & Interface Science 14 (2009) 364-371; (ii) *Stabilization and dispersion of carbon nanomaterials in aqueous solutions*: A review, by Yasir A. J. Al-Hamadani, Kyoung Hoon Chu, Ahjeong Son, Jiyong Heo, Namguk Her, Min Jang, Chang Min Park, Yeomin Yoon, Separation and Purification Technology 156 (2015) 861-874; and (iii) *Aqueous dispersion stability of multi-carbon nanoparticles in anionic, cationic, neutral, bile salt and pulmonary surfactant solutions*, by Kumar, P.; Bohidar, H. B., Colloids and Surfaces A: Physicochem. Eng. Aspects 361 (2010) 13-24. Experience, manufacturer recommendations, brochures, industry publications, and so forth can represent other factors considered when selecting a particular dispersant for further testing.

In one illustration, the dispersant belongs to a class is a styrene maleic anhydride resin and/or its derivatives, the latter being polymers made via a chemical reaction of styrene maleic anhydride resin or prehydrolyzed styrene maleic anhydride resin with small or large organic molecules having at least one reactive end group, for example an amine or epoxide group. In general, this class of polymeric dispersants have a styrene maleic anhydride copolymer backbone modified with various polymeric brushes and/or small molecules. Some exemplary commercial formulations can be found under the tradename of DISPERBYK®, from BYK. Some DISPERBYK® specifications include DISPERBYK®-190 and DISPERBYK®-2012, to name a few.

In another illustration, the dispersant includes PVP (in various molecular weights) or its derivatives, the latter generally referring to dispersants that either have a PVP backbone or copolymers that include PVP.

In a further illustration, the dispersant includes cellulose or cellulose derivatives, the latter having a cellulose backbone optionally modified by small or large organic molecules having at least one reactive end group. In one specific example, the cellulose-based dispersant is CMC (e.g., at various viscosities), a compound typically prepared by the reaction of cellulose with chloroacetic acid. In another example, the dispersant is hydroxyethyl cellulose.

Other possible candidates include sodium dodecyl sulfate (SDS), sodium, dodecyl benzyl sulfonate, derivatives of polyacrylic acid and so forth.

Once selected, the dispersant is combined with the CNS material, the latter being provided in an amount that is about 1 wt % or less, e.g., 0.1, 0.2, 0.3, 0.4, 0.5, 0.6, 0.7, 0.8, 0.9 or 1.0 wt %, generally within the range of from about 0.1 to 1 wt % of the overall dispersion). The resulting mixture typically includes water (which can be added separately or as part of a dispersant formulation. After a milling step (using zirconia beads, for instance), the formulation is analyzed visually. No further action needs to be taken with respect to the particular dispersant if the test fails, e.g., the solid particles do not become uniformly dispersed but rather form clumps. On the other hand, a composition which, even if viscous, shows uniform consistency, with flowable properties, can be further investigated. If foaming occurs, small amount of a defoamer agent can be added to mitigate the issue.

A next line of tests involves a larger volume of a CNSs-containing dispersion and can include evaluations with respect to the fineness of grind of the solids in the dispersion (by Herman gauge techniques) and/or the rheological properties of the dispersion. A cycling experiment can be conducted to assess the cycling properties of a Si-containing graphite anode prepared using the candidate dispersion.

Various other tests that can be conducted relate to the solubility of the dispersant in the electrolyte and electrochemical stability (by cyclic voltammetry). Low solubility of the dispersant in the LiB electrolyte (e.g. <1 g/kg) is desired but not mandatory. The cyclic voltammetry (CV) is one of the standard methods to reveal the electrochemical stability of the materials at the given voltage range. CV testing was performed with half coin cells having the graphite electrode and further comprising a dispersant or thickening agent of interest. A detailed protocol for cell fabrication and CV testing is provided in the Experimental section below.

Dispersions with promising cycling results can be advanced to pouch cell evaluations. Dispersions with satisfactory fineness of grind, rheology, cycling results and/or other properties can be further evaluated at a full-scale LiB manufacturing facility.

An initial screening of various formulations containing different levels of CNSs and different dispersants identified CMC and PVP as candidates that appeared to produce non-foamy flowable formulations at CNS loading of either 0.4 wt % or 0.6 wt %. These dispersants can be subjected to further testing. At the same loading, DISPERBYK®-190 showed promising results, requiring, however, a defoaming agent to alleviate formation of the foam during the milling process.

Similar screening experiments also can be conducted to identify and/or develop suitable aqueous dispersions containing CNSs and CB.

Further aspects of the invention relate to the use of CNSs, e.g., in an aqueous dispersion such as described herein, or of a combination of CNSs and CB in the production of any number of energy storage devices. For example, some embodiments relate to anode compositions for a lithium-ion battery.

In many implementations, the electroactive material in the anode is or contains graphite, e.g., natural graphite, artificial graphite or blends of both. Commercially available types of graphite that can be used include mesocarbon microbead (MCMB), mesophase-pitch-based carbon fiber (MCF), vapor grown carbon fibers (VGCF), artificial graphite, natural graphite and others. In other implementations, the active anode compound used comprises, consists essentially of or consists of silicon. In one embodiment, the active anode material is a silicon-graphite composite, graphite containing nanosilicon (Si), $SiO_x$, carbon coated Si or $SiO_x$ particles or combinations thereof.

Principles described herein also can be used with other active anode materials. As used herein, an "active anode material" is a material capable of undergoing reversible, Faradaic and/or capacitive electrochemical reactions. In one embodiment, the active anode material is a material capable of intercalating or alloying with lithium ions during a charging process. Examples include but are not limited to: (a) intercalation/de-intercalation materials (e.g., carbon based materials, porous carbon, carbon nanotubes, graphene, $TiO_2$, $Li_4Ti_5O_{12}$, and so forth); and (b) alloy/de-alloy materials (e.g., Si, $SiO_2$, doped Si, Ge, Sn, Al, Bi, $SnO_2$, etc.); and (c) conversion materials (e.g., transition metal oxides ($Mn_xO_3$, NiO, $Fe_xO_y$, CuO, $Cu_2O$, $MoO_2$. etc.), metal sulfides, metal phosphides and metal nitrides respresented by the formula $M_xX_y$, where X=S, P, N)).

The concentration of the active anode material, e.g., graphite, silicon, lithium titanate ($Li_4Ti_5O_{12}$, often also referred to as "LTO"), $SiO_x$, silicon-graphite composite, silicon-carbon composites, etc., can vary, depending on the particular type of energy storage device. In illustrative examples, the electroactive anode component is present in the electrode composition in an amount of at least 80% by weight, e.g., at least 85, 90 or 95 wt %, relative to the total weight of the (dry) electrode composition, e.g., in an amount ranging from 80% to 99% by weight, such as, within the range of from about 80 to about 85 wt %, from about 85 to about 88 wt %, from about 88 to about 90 wt %, from about 90 to about 92 wt %, from about 92 to about 95 wt % from about 95 to about 97 wt %, or from about 97 to about 99 wt %, relative to the total weight of the electrode composition.

In some embodiments, the electrode composition contains one or more binders, used, e.g., to enhance the mechanical properties of the formed electrode. Exemplary binder materials include, but are not limited to, fluorinated polymers such as poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders, such as poly(ethylene) oxide, polyvinyl-alcohol (PVA), cellulose, carboxymethylcellulose (CMC), styrene-butadiene rubber (SBR), starch, hydroxypropylcellulose, regenerated cellulose, polyvinyl pyrrolidone (PVP), and copolymers and mixtures thereof. Other possible binders include polyethylene, polypropylene, ethylene-propylene-diene terpolymer (EPDM), sulfonated EPDM, and fluoro rubber and copolymers and mixtures thereof. In illustrative examples, the active anode material is graphite or a blend of graphite with $SiO_x$, and the binders are either PVDF or CMC with SBR.

The binder can be present in the anode composition in an amount of about 1 to about 15% by weight, e.g., about 1 to 14; 1 to 12; 1 to 10; 1 to 8; 1 to 6; 1 to 4; 1 to 2 wt %; or 2 to 15; 2 to 14; 2 to 12; 2 to 10; 2 to 8; 2 to 6; 2 to 4 wt 5; or 4 to 15; 4 to 14; 4 to 12; 4 to 10; 4 to 8; 4 to 6 wt %; or 6 to 15; 6 to 14; 6 to 12; 6 to 10; 6 to 8; or 8 to 15; 8 to 14; 8 to 12; 8 to 10 wt %; or 10 to 15; 10 to 14; 10 to 12 wt %; or 12 to 15; 12 to 14 wt %; or 14 to 15 wt %. Also possible are ranges within or ranges overlapping these ranges.

In some embodiments, the CCA component includes both CNSs and CB. With respect to a dry electrode composition such as used in a graphite- and silicon-containing negative electrode for LIBs, for instance, the CCA loading can less than or equal to about 10 wt %, and often less than or equal to about 5 wt %, and often less than or equal to about 2 wt %, for example less than 1.9, 1.8, 1.7 or 1.6 wt %. In other embodiments, the CCA loading relative to a dry electrode composition such as used in a graphite anode for LIBs, for instance, is 1.5 wt % or less, e.g., at least 1.4, 1.3, 1.2, 1.2, 1.0, 0.95, 0.90, 0.85, 0.80, 0.75, 0.70, 0.65, 0.60. 0.55, 0.50. 0.45, 0.40, 0.35, 0.30, 0.25, 0.20, 0.15 or 0.10, wt % or less. In specific implementations, the CCA loading (based on a dry electrode composition such as used in a silicon-containing graphite anode for lithium batteries) is no greater than 0.5 wt %, e.g., within the rage of from about 0.1 to about 0.5 wt %. CCA loadings can be in the approximate range of from about 0.1 to 0.2; from 0.1 to 0.4; from 0.1 to 0.6; from 0.1 to 0.8; from 0.1 to 1.0; from 0.1 to 1.2; from 0.1 to 1.4; from 0.1 to 1.6; from about 0.1 to about 1.8; from 0.1 to 2.0 wt %; or from 0.2 to 0.4; from 0.2 to 0.6; from 0.2 to 0.8; from 0.2 to 1.0; from 0.2 to 1.2; from 0.2 to 1.4; 0.2 to 1.6; from 0.2 to 1.8; from 0.2 to 2.0 wt %; or from 0.4 to 0.6; from 0.4 to 0.8; from 0.4 to 1.0; from 0.4 to 1.2; from 0.4 to 1.4; from 0.4 to 1.6; from 0.4 to 1.8; from 0.4 to 2.0 wt %; or from 0.6 to 0.8; from 0.6 to 1.0; from 0.6 to 1.2; from 0.6 to 1.4; from 0.6 to 1.6; from 0.6 to 1.8; from 0.6 to 2.0; or from 0.8 to 1.0; from 0.8 to 1.2; from 0.8 to 1.4; from 0.8 to 1.6; from 0.8 to 1.8; from 0.8 to 2.0 wt %; or from 1.0 to 1.2; from 1.0 to 1.4; from 1.0 to 1.6; from 1.0 to 1.8 or from 1.0 to 2.0 wt %; or from 1.4 to 1.6; from 1.4 to 1.8; from 1.4 to 2.0 wt %; or from 1.6 to 1.8; from 1.6 to 2.0 wt %; or from 1.8 to 2.0 wt %. Ranges within or ranges overlapping the above-mentioned ranges also can be selected.

For many LIBs, the loading of a CCA that contains both CNSs and CB is lower than that needed when using other CCAs, CB only, for instance. In many cases, the CB particles that can be typically used as CCA in electrodes have a Brunauer-Emmett-Teller (BET) surface area less than 200 $m^2$/g, and an oil adsorption number (OAN) greater than 150 mL/100 g. CB specifications characterized by these and/or other properties known and recognized by those skilled in the art are shown as specifications I-IV in Table 1.

The loading of a CCA that includes both CNSs and CB can also be lower than that needed with another type of CCA, namely a CNT material. An illustrative specification of a CNT material that could be used in anode compositions is shown as specification V in Table 2.

The electrode composition can be prepared by combining (e.g., by uniformly mixing) the various constituents, which can be added in any order designed to obtain the mixture and, in particular, a mixture that is homogeneous. Suitable mixing techniques include mechanical agitation, stirring, mixing, kneading, etc.

CCAs that include both CNSs and CB can be mixed with an anode electroactive ingredient, e.g., a graphite-containing material, using dry direct kneading, high shear milling, a pre-made dispersion, e.g., an aqueous dispersion such as described herein, or another suitable technique.

In one example, an electrode (e.g., anode) composition is made by homogeneously interspersing (e.g., by uniformly mixing) a CCA component (made of CNSs and CB, for instance) with the electroactive anode component such as graphite. In another example, a binder is homogeneously interspersed with a CCA component (containing CNSs and CB) and with graphite or another suitable electroactive anode component, for example a silicon-containing component. When provided in some forms, e.g., in granules, pellets, or flake form, the CNS material, together with the CB particulate component, can be directly incorporated in a slurry containing the active electrode material (e.g., graphite, silicon, $SiO_x$, etc.).

In other embodiments, pellets, granules, flakes or other forms of CNSs are first dispersed in a liquid medium, e.g., an aqueous formulation of CMC, generating CNS fragments (including partially fragmented CNSs) and/or fractured CNTs. The dispersion can be prepared from a starting material such as, for example, uncoated, PU- or PEG-coated CNS, or CNSs having any other polymeric binder coating. In one implementation, the polymeric binder coating is a dispersant. In one implementation, the electroactive material, graphite, for example, is mixed with CNS granules, pellets or flakes in the presence of a liquid binder such as, for example, an aqueous binder formulation of CMC and/or SBR, or a NMP-based formulation including PVDF.

Illustrative CNS fragment sizes present in the dispersion can be within the range of from about 0.5 to about 20 μm, e.g., within the range of from about 0.5 to about 1 μm; from about 1 to about 5 μm; from about 5 to about 10 μm; from about 10 to about 15 μm; or from about 15 to about 20 μm. In some cases, reducing the fragment size too much, e.g., to less than 0.5 μm, can compromise the electrical properties associated with utilizing CNSs. CB particles in the dispersion can be within a range of from about 0.1 micron to about 10 microns.

In specific embodiments, CNSs are provided in an aqueous dispersion such as described herein. Optionally, the aqueous dispersion also includes CB.

In one approach, the aqueous dispersion is first combined with a graphite and a first binder such as CMC. The resulting blend is mixed or kneaded and combined with an additional amount of water (if required) and the Si-containing component, e.g., a commercially available SiO/C powder or Si/C powder. After additional mixing or kneading, a second binder such as SBR can be mixed in, followed by the addition of water.

The resulting electrode composition can take the form of a paste or a slurry that combines at least one anode electroactive material, a CCA material, e.g., a combination of CB and CNSs, dispersant(s) (if present), nonconductive additive(s) (if present), solvent, and binder (if present). In other embodiments, the electrode composition is a solid formed by the removal of solvent from the paste or slurry.

A battery electrode can be formed by applying an electrode composition such as the anode composition described above, e.g., in the form of a slurry, onto an electrically conducting substrate (e.g., copper current collector), followed by removing the solvent. The paste can be applied by techniques such as doctor blade coating, reverse comma bar coating, roll-to-roll coating or extrusion.

Solvent is removed by drying techniques such as air drying, e.g., at ambient temperature, heating in a suitable oven, and so forth. Temperatures used can range from 20° to 130° C., for example.

The deposited electrode/current collector can be cut to the desired dimensions, optionally followed by calendering.

One illustrative approach for the preparative process may include some or all of the following steps: wetting and homogenizing CNSs in water with a suitable dispersant; wet-milling of CNSs dispersion until desired level of grinding gauge is achieved; optionally adding CB and use either high energy dispersing method or media milling method to achieve the required level for the fineness of the grind.

In one embodiment, the anode is produced by delivering the CNS material via an aqueous dispersion such as described herein. The CNSs employed can be encapsulated, having, for example, a coating selected from the group consisting of CMC, PVP, polyethylene glycol, polyurethane. In one implementation, the coating material serves as a dispersant in the process of dispersing encapsulated CNS powder or granules in the solvent. In one implementation, the dispersion includes a dispersant such as CMC, PVP, DISPERBYK®-190, and water, e.g., in an amount ranging from about 0.1 to about 1 wt %. The dispersion can further contain CB, such as, for instance, a CB having a BET no greater than 120 m$^2$/g and an OAN of at least 200 mL/100 g.

According to a possible protocol, the dispersion is added to and combined with a mixture containing graphite, a binder (CMC for instance) and optionally CB. After mixing, the silicon component (e.g., a SiO/C powder) is added. The resulting blend is mixed and combined with a second binder, SBR, for example. Water can be added to form a slurry with the desired viscosity target, and the slurry can be coated onto copper foil and dried. The electrode sheets or punched discs can be calendared to the targeted density.

In one implementation, the amount of CNS material used to prepare a Si-containing graphite anode, via an aqueous dispersion such as described herein, is less than about 1 wt % (on a dry basis of the anode composition), e.g., less than 0.75 wt %, within the range of from about 0.1 wt % to about 0.5 wt %, for instance. In another implementation, the amount of CB material employed in conjunction with the CNS material is less than about 1 wt %, (on a dry basis of the anode composition), e.g., less than 0.5 wt %, within the range of from about 0.05 wt % to about 0.5 wt %, for instance. In yet another implementation, the amount of combined CNS material and CB utilized to make the anode is less than about 1 wt % (on a dry basis of the anode composition), e.g., less than 0.4 wt %, within the range of from about 0.05 wt. % to about 0.25 wt %, for instance.

The various operations leading to the formation of the electrode can preserve the integrity of some of the initial CNSs used, which will remain intact. Some steps and/or conditions, however, can alter at least some of the initial CNSs employed. As described above, one example involving such an operation and/or condition is the application of shear forces, as encountered, for instance, when preparing a dispersion from a CNS starting material.

In some situations, an initial CNS is broken into smaller CNS units or fragments. Except for their reduced sizes, these fragments generally share the properties of intact CNS and can be identified by electron microscopy and other techniques, as described above.

Also possible are changes in the initial nanostructure morphology of the CNS. For example, applied shear can break crosslinks between CNTs within a CNS to form CNTs that typically will be dispersed as individual CNTs in the electrode composition. It is found that structural features of branching and shared walls are retained for many of these CNTs, even after the crosslinks are removed. CNTs that are derived (prepared) from CNSs and retain structural features of CNT branching and shared walls are referred to herein as "fractured" CNTs. These species are capable of imparting improved interconnectivity (between CNT units), resulting in better conductivity at lower concentrations.

Thus, in comparison to electrodes or electrode compositions that employ ordinary, individualized CNTs, e.g., in pristine form, electrodes and electrode compositions described herein will often include fractured CNTs. These fractured CNTs can readily be differentiated from ordinary carbon nanotubes through standard carbon nanotube analytical techniques, such as SEM, for example. It is further noted that not every CNT encountered needs to be branched and share common walls; rather it is a plurality of fractured CNTs, that, as a whole, will possess these features.

The formed electrode can be incorporated into a lithium-ion battery according to methods known in the art, for example, as described in "Lithium Ion Batteries Fundamentals and Applications", by Yuping Wu, CRC press, (2015). In some embodiments, the batteries are coin types such as, for example, 2032 coin-cells, 18650 cylindrical cells, pouch cells, and others. In addition to the anode containing a CNS material, e.g., as described above, the battery includes other components, e.g., a cathode made, for example of cathode materials based on intercalation chemistry, e.g., typically involving chemical reactions that transfer a single electron. Other types of cathode materials (having lithium ions inserted into $FeF_3$, for instance) can transfer multiple electrons through more complex reaction mechanisms, called conversion reactions.

Examples of suitable cathode electroactive materials include but are not limited to LCO, LMO, NCM, NCA, LCP, LFP, LFSF, LTS and others, as known in the art or as developed in the future. In some embodiments, the CNS-containing anode composition described above is used in conjunction with NCM or NCA cathode compositions. NCM (also referred to as "NMC") and NCA are generally known to those skilled in the art of batteries.

In more detail, NCM can be represented by the formula $Li_{1+x}(Ni_yCo_{1-y-z}Mn_z)_{1-x}O_2$, wherein x ranges from 0 to 1, y ranges from 0 to 1 (e.g., 0.3-0.8), and z ranges from 0 to 1 (e.g., 0.1-0.3). Examples of NCMs include $Li_{1+x}(Ni_{0.33}Co_{0.33}Mn_{0.33})_{1-x}O_2$, $Li_{1+x}(Ni_{0.4}Co_{0.3}Mn_{0.3})_{1-x}O_2$, $Li_{1+x}(Ni_{0.4}Co_{0.2}Mn_{0.4})_{1-x}O_2$, $Li_{1+x}(Ni_{0.4}Co_{0.1}Mn_{0.5})_{1-x}O_2$, $Li_{1+x}(Ni_{0.5}Co_{0.1}Mn_{0.4})_{1-x}O_2$, $Li_{1+x}(Ni_{0.5}Co_{0.3}Mn_{0.2})_{1-x}O_2$, $Li_{1+x}(Ni_{0.5}Co_{0.2}Mn_{0.3})_{1-x}O_2$, $Li_{1+x}(Ni_{0.6}Co_{0.2}Mn_{0.2})_{1-x}O_2$, and $Li_{1+x}(Ni_{0.8}Co_{0.1}Mn_{0.1})_{1-x}O_2$.

NCA can be represented by the formula $Li_{1+x}(Ni_yCo_{1-y-z}Al_z)_{1-x}O_2$, wherein x ranges from 0 to 1, y ranges from 0 to 1, and z ranges from 0 to 1. An example of an NCA is $Li_{1+x}(Ni_{0.8}Co_{0.15}Al_{0.05})_{1-x}O_2$.

The concentration of NCM or NCA in the electrode composition can vary, depending on the particular type of energy storage device. In some cases, the NCM or NCA is present in the electrode composition in an amount of at least 90% by weight, e.g., greater than 95% by weight, relative to the total weight of the electrode composition, e.g., an amount ranging from 90% to 99% by weight, relative to the total weight of the electrode composition.

In addition to the cathode electroactive material, cathode compositions often include a binder, e.g., poly(vinyldifluoroethylene) (PVDF). Other binders, such as those described above, for instance, can be employed to prepare the cathode composition.

In some embodiments, the cathode composition also contains a conductive additive, such as, for instance a CCA. Examples include CB, CNTs, graphite, graphene and so forth.

Some cathode compositions can include CNSs, CNS fragments and/or fractured CNTs. Such cathode compositions their preparation and use are described in U.S. Provisional Patent Application No. 62/822,097, with the title *Cathode Electrode Compositions for Battery Applications*, filed on Mar. 22, 2019, and in U.S. Non-Provisional Application with the title *Cathode Electrode Compositions for Battery Applications*, filed concurrently herewith. The entire contents of both applications are incorporated herein by this reference.

In many cases, the CNSs employed to prepare the cathode composition are coated, e.g., PU- or PEG-coated. When dried, illustrative cathode compositions contain carbon nanostructures, carbon nanostructure fragments and/or fractured nanotubes in an amount no greater than about 1 wt %. Thus, in specific embodiments of the invention, both anode and cathode contain CNSs, fragments of CNSs and/or fractured CNTs.

In addition to the two electrodes, the Li ion battery comprises a suitable electrolyte, which can be non-aqueous. Examples of possible electrolytes include, for instance, ethylene carbonate-dimethyl carbonate-ethylmethyl carbonate (EC-DMC-EMC), vinylene carbonate (VC), $LiPF_6$; ethylene carbonate-diethylcarbonate (EC-DEC, $LiPF_6$; or (EC-DMC), LiPF6. Furthermore, electrolyte composition may contain special additives known to enhance the performance of $SiO_x$ or silicon comprising anodes, for example fluorinated carbonates, such as fluoroethylene carbonate and others. A suitable glass fiber micro filters (for example, Whatman GF/A) or polypropylene/polyethylene membrane (for example, Celgard® 2300) is used as a separator that absorbs electrolyte and prevents electrical contact between electrodes while allowing diffusion of Li ions.

In other embodiments, the compositions described herein are used (e.g., incorporated) in electrodes of other energy storage devices, such as, primary alkaline batteries, primary lithium batteries, nickel metal hydride batteries, sodium batteries, lithium sulfur batteries, lithium air batteries, and supercapacitors. Methods of making such devices are known in the art and are described, for example, in "Battery Reference Book", by TR Crompton, Newness (2000). In one example, compositions and/or techniques described herein are used to prepare batteries that include a solid electrolyte.

Various techniques can be employed to characterize the electrode compositions, electrodes and batteries or described herein, and/or identify the presence of CNSs, CNS fragments or fractured CNTs. Examples include but are not limited to electron microscopy, e.g., TEM, SEM, Raman spectrometry, or other suitable qualitative or quantitative analytical methods.

Electrode performance and/or properties can be evaluated by procedures known in the art, or techniques adapted or developed. Suitable techniques include, for instance, in-plane and thru plane electrode conductivity, electrochemical impedance spectroscopy (EIS), constant current charge-discharge, hybrid pulse power capability (HPPC), cycling. Some examples are described below.

Aqueous CNS dispersions disclosed in this invention allow users preparing silicon-comprising anode compositions with CNSs that are uniformly dispersed throughout at low CNSs loading and utilizing the conventional manufacturing process for LiB anodes. Even at relatively low concentration, CNSs and/or CNS-derived components such as CNS fragments and/or fractured CNTs appear capable of setting up and largely retain a conductive network with silicon-comprising and other anode active particles, which results in the boost of the cycling performance in the cells with at least 7-10 wt % Si or $SiO_x$ anodes.

Adding CB can further enhance performance of the anode comprising Si or SiOx components, specifically its cycling and low temperature performance. Besides possible performance benefits, aqueous CNS dispersion with CB may allow users to simplify greatly their manufacturing process, avoid possible agglomeration issues in the anode slurry or coating when various carbon additives are combined, and improve throughput.

MWCNTs are often used in the electrode composition of commercial Li ion batteries. It was found that the capacity retention of anodes that included a combination of MWCNT and Super® P-Li was less effective when compared to that of anodes using a conductive additive based on CNSs (or a combination of CNSs and CB). Moreover, the amount of encapsulated CNS (or encapsulated CNSs and CB) required for a desired performance was less than the total carbon additives used in anodes prepared from MWCNT and Super® P-Li. Relative to anodes using MWCNT and Super® P-Li, anodes fabricated using CNSs or combinations of CNSs and CB required less CCA amounts for a comparable performance.

The invention is further illustrated by the following non-limited examples.

EXAMPLES

Example 1

Preparation of Aqueous Dispersions Containing CNS

A series of aqueous solutions with dispersant concentrations ranging from 0.1 wt % to 1 wt % in deionized (DI) water were prepared in a study aimed at identifying suitable dispersants or thickening agents for making CNS dispersions.

100 g of each solution was placed in a paint can along with a desired amount of PEG encapsulated CNS powder, typically in the range of 0.2-1 wt. %, and 100 g zirconia beads grinding media having a size of 0.5 mm. The dispersion components were bead milled for 4 hours (h) in the sealed cans by utilizing a LAU disperser (model DAS 200, manufactured by LAU GmbH).

After milling, the dispersion appearance was analyzed visually and only the dispersions that showed uniform consistency with clear flowable behavior in the can (and through 0.1 mm mesh filter necessary to separate the media) were advanced to the next step. This approach allowed prescreening various dispersants and thickeners, and determining suitable concentration range for both CNS and dispersant components. Table 3 depicts a summary for tested dispersants and viscosity thickener agents along with the highest CNS loading that was possible to evaluate. The dispersant loading column in Table 3 captures the respective concentration of the dispersant/thickener agent that was required to achieve acceptable dispersion consistency for the "pass" formulations. In case of formulations that visually "failed", the reported value was the highest loading of CNS and dispersant tested.

TABLE 3

| Dispersant | CNS, wt % | Dispersant loading, wt % | Visual | Viscosity @ 10 s$^{-1}$, Pa·s | Hegman Gauge | E/C stability |
|---|---|---|---|---|---|---|
| CMC | 0.4 | 0.5 | Pass | 2.2 | Pass | Pass |
| PAANa | 0.6 | 0.6 | Failed | n/a | n/a | n/a |
| PMMA | 0.6 | 0.6 | Failed | n/a | n/a | n/a |
| PVP | 0.6 | 0.4 | Pass | 4 | Pass | Pass |
| PVP | 0.6 | 0.6 | Pass | 1.8 | Pass | Pass |
| BYK ®-2012 | 0.3 | 0.75 | Failed | n/a | n/a | n/a |
| BYK ®-190 | 0.6 | 0.6 | Pass | | | |
| TEGO ® 761W | 0.6 | 0.6 | Failed | n/a | n/a | n/a |

The compositions for the "pass" dispersions were used to prepare larger volume of aqueous CNS dispersions for subsequent evaluation of rheology and performance in the Li-ion battery performance testing.

Specifically, 500 g of aqueous mixture that contained the desired amount of dispersant and encapsulated CNS powder was premixed by using a lab disperser (Caframo, Model BDC3030, 1000 rpm for 5 h). The premixed composition was then fed into a MiniCer media mill (Netzsch MiniCer Media Mill, Type 993-04) equipped with 0.4 mm zirconia (YSZ) grinding media. The dispersion was milled for 90 min using a recirculation mode.

The viscosity of the final dispersion was tested using a rheometer (model AR 2000, TA Instrument) and 40 mm serrated steel plate geometry plate geometry. The viscosity data reported in Table 3 was obtained at the shear rate of 10 s$^{-1}$. The fineness of the grind was evaluated by a standard Hegman gauge (Gardco®). The "Pass" criteria were assigned to the dispersions showing no specks larger than 20 microns. As seen in Table 3, the dispersions or thickeners with CMC, PVP and BYK-190 passed the initial criteria.

While a dispersant can be important when making a dispersion with suitable rheology, stability and fineness of the grind, its presence in the electrochemical cell is considered generally undesirable as it may lead to parasitic reactions. Therefore, another important consideration for the choice of a dispersant or thickener is its electrochemical stability, which can be assessed by cyclic voltammetry (CV).

CV testing was performed with half coin cells (2032) that included a graphite electrode, Li foil electrode and an electrolyte with the following composition: 1M LiPF6 (Sigma Aldrich) in ethylene carbonate-dimethyl carbonate (EC: DMC=1:1 by weight) with 10 wt % mono-fluoroethylene carbonate (FEC, Solvay Fluorides). The graphite electrode was prepared by coating an aqueous slurry containing 93 wt % graphite: 4 wt % dispersant or thickening agent: 2 wt % CMC: 1 wt % SBR on the dry basis. The solid % in the anode slurry was 50 wt %. After coating and drying, several 15 mm in diameter disks were punched by using MTI Precision Disc Cutter (model MSKT-06) and calendared to 1.2 g/cc using a manual rolling press (MR-100, MTI Corp).

The graphite electrode disks and 16 mm in diameter Li foil disks were assembled into 2032 coin-cell in an argon-filled glove box (M-Braun). Glass fiber micro filters (Whatman GF/A) with 17 mm diameter were used as separators.

As a control, a coin cell with graphite electrode comprising only 97% graphite: 2 wt % CMC: 1 wt % SBR and no extra dispersant or thickener was prepared for comparison of cyclic voltammetry (V-I) plots. The voltage window of 0-3V vs L$^+$/Li was used with the scanning rate of 0.5 mV/s. Six cycles was performed for each formulation along with a control. The "pass" was assigned to the dispersants or thickeners that showed no electrochemical activity (e.g. meaningful deviation in the current values vs the control formulation at a given voltage). The results are summarized in the Table 3 under "E/C" stability column.

Table 4 depicts a few examples of the aqueous CNS dispersions made following Example 1 for electrochemical evaluation in silicon anode applications. As seen in Table 4, Disp C also included a carbon black and was prepared as described in Example 2 below.

TABLE 4

| ID | CNS loading | CB loading | Dispersant or Thickener | Dispersant aid loading | Viscosity (10 s$^{-1}$) | Hegman Gauge |
|---|---|---|---|---|---|---|
| Disp A | 0.6 | 0 | CMC | 0.6 | 4.5 | Pass |
| Disp B | 0.6 | 0 | PVP | 0.6 | 1.8 | Pass |
| Disp C | 0.6 | 1 | PVP | 0.6 | 2.3 | Pass |

Example 2

Preparation of Aqueous Dispersion Comprising CNS and a Conductive Carbon Black Additive In this example an aqueous dispersion of CNS also included a conductive carbon black and was labelled as Disp C.

Disp C dispersion was prepared by starting with Disp B (as described in Example 1). 3 g of LITX® HP conductive carbon black powder with OAN=250 ml/100 g and BET=100 m$^2$/g (available from Cabot Corporation) was slowly added to 300 g of Disp B. The mixture was further milled using MiniCer mill for 15 min using the same conditions disclosed in the Example 1. As seen in Table 3 above, Disp C had acceptable viscosity, excellent Hegman gauge results and was stable in storage (showed no precipitation over a period of one month).

Example 3

Preparation of an Anode Slurry Using an Aqueous CNS Dispersion 20 g of aqueous CNS-containing Dis B (according to Example 1) and 21.82 g of aqueous 2 wt % Carboxymethyl Cellulose, Sodium Salt (CMC) were combined in a cup from Thinky mixer (model ARE-310) and mixed for 10 mins. The mixture was then combined with 18.94 g of graphite (BTR-918, available from BTR, China), hand-mixed for 5 minutes and mixed by the Thinky mixer for additional 5 minutes. 2.1 grams SiO/C powder (KSC-1265, Shin-Etsu Chemical Co., Ltd) was added and mixed for 3 min using the Thinky mixer. This was followed by combining 0.485 g of styrene-butadience rubber (SBR) (TD105A, JSR) with the mixture and mixing for 1 minute using the same mixer. Finally, 1.61 grams of DI water was added to the slurry, and the slurry was mixed for 24 additional minutes using the Thinky mixer.

The composition of the slurry was 96.45 wt % graphite/SiO (with the ratio of graphite to SiO=90:10); 0.55 wt % CNS (Disp B); 2 wt % CMC; and 1 wt % SBR on the dry basis.

Example 4

Preparation of the Anode Slurry Using Aqueous CNS Dispersion and CB Conductive Carbon Additive 0.25 g of LITX® HP conductive carbon black (OAN=250 ml/100 g and BET=100 m$^2$/g, available from Cabot Corporation) and 25 g of aqueous 2 wt % Carboxymethyl Cellulose, Sodium Salt (CMC) were combined in a cup from a Thinky mixer (model ARE-310) and mixed for 10 mins. 22.92 g of aqueous CNS Dis B was combined with the mixture for another 1 min. The resulting composition was combined with 21.48 g of graphite (BTR-918, available from BTR, China), hand-mixed for 5 minutes then mixed by the Thinky mixer for 5 additional minutes. 2.386 grams SiO/C powder (KSC-1265, available from Shin-Etsu Chemical Co., Ltd) was added to the mixture and mixed for additional 3 minutes. After that, 0.556 grams of styrene-butadience rubber (TD105A, JSR) were combined with the mixture and mixed for 1 minute. Finally, DI water (1.84 grams) was added to the slurry, and the vial was mixed for 24 minutes. The composition of the slurry was 95.45 wt % graphite/SiO (with the ratio of graphite to SiO of 90:10); 0.55 wt % CNS (Disp B); 1 wt % CB; 2 wt % CMC; and 1 wt % SBR on the dry basis.

Example 5

Preparation of the SiO-Graphite Anodes from the Slurries Containing CNS and CNS with Conductive Carbon Black Anode slurries prepared as described in Examples 3 through 5 were coated on copper foil using an automated doctor blade coater (Model MSK-AFA-III from MTI Corp.) targeting 7.4 mg/cm$^2$ areal loading. The anode was pre-dried in the oven at 110° C. for 120 minutes. Further, the electrode was dried at 110° C. under vacuum overnight. Sixteen millimeter-in-diameter discs were punched by using MTI Precision Disc Cutter (model MSKT-06) and calendared to 1.2 g/cc using a manual rolling press (MR-100, MTI Corp).

Comparative Example 6

Preparation of the SiO-Graphite Anodes with No Additional Conductive Additive

For comparison purposes, a composition containing no conductive additive was prepared as follows.

25 g of aqueous 2 wt % Carboxymethyl Cellulose, Sodium Salt (CMC) was combined with 21.48 g of graphite (BTR-918, available from BTR, China), hand-mixed for 5 minutes then mixed by the Thinky mixer for 5 minutes. The resulting composition was combined with 2.386 grams SiO/C powder (KSC-1265, available from Shin-Etsu Chemical Co., Ltd) and mixed for additional 3 minutes. After that, 0.556 grams of styrene-butadience rubber (TD105A, JSR) were combined with the mixture and mixed for 1 minute. Finally, DI water (1.84 grams) was added to the slurry, and the vial was mixed for 24 minutes. The resulting anode had the following composition: 97 wt % graphite/SiO (with the ratio of graphite to SiO=90:10); 2 wt % CMC; and 1 wt % SBR on a dry basis. The electrode had 7.4 mg/cm$^2$ areal loading and was calendared to 1.2 g/cc.

Comparative Example 7

Preparation of the SiO-Graphite Anodes with Conductive Carbon Black Additive

Another formulation used for comparison purposes contained a high conductivity carbon black additive, as the only conductive additive for a graphite/SiO anode. It was prepared using LITX® HP conductive carbon black, available from Cabot Corporation, characterized by the size of the primary particles, which was 18 nm, a nitrogen BET surface area of about 100 m$^2$/g and OAN (structure) value of about 250 ml/100 g.

0.625 g of LITX® HP and 25 g of aqueous 2 wt % carboxymethyl cellulose, sodium salt (CMC) were combined in a cup from a Thinky mixer and mixed for 10 mins. The resulting composition was combined with 21.48 g of graphite (BTR-918), hand-mixed for 5 minutes then mixed by the Thinky mixer for 5 additional minutes. 2.386 grams SiO/C powder (KSC-1265) was added to the mixture and mixed for additional 3 minutes. After that, 0.556 grams of styrene-butadience rubber (TD105A) were combined with the mixture and mixed for 1 minute. Finally, DI water (2 grams) was added to the slurry, and the vial was mixed for 24 minutes.

The anode had the following composition on a dry basis: 94.5 wt % graphite/SiO (with the ratio of graphite to SiO of 90:10); 2.5 wt % conductive carbon black; 2 wt % CMC; and 1 wt % SBR. The electrode had 7.3 mg/cm$^2$ areal loading and was calendared to 1.2 g/cc.

Comparative Example 8

Preparation of the SiO-Graphite Anodes with Conductive Additive Comprising MWCNT and Conductive Carbon Black An anode electrode comprising multiwall carbon nanotubes (MWCNT LB217 dispersion available from Jiangsu Cnano Technology Co. Limited) and Super P® Li conductive carbon black powder (available from Imerys S. A.) was prepared in the same manner as described in Example 4 and 5. The resulting anode composition on the dry basis contained: 94.5 wt % graphite/SiO (with the ratio of graphite to SiO of 90:10); 1.5 wt % MWCNT; 1 wt % conductive carbon black:2 wt % CMC; and 1 wt % SBR. The electrode had 7.4 mg/cm$^2$ areal loading and was calendared to 1.2 g/cc.

The conductive carbon black in this Example had a nitrogen BET area of 62 m$^2$/g and OAN (structure) value of about 200 ml/100 g.

Example 9

Preparation of the Cathodes and Cell Assembly

The same cathode was used for the evaluation of all anodes specified above and had the following composition: NCM622 active material; LITX® HP carbon conductive additive (available from Cabot Corporation); and HSV 900 PVDF binder in the wt % ratio of 97:1.5:1.5 on the dry basis.

Specifically, the cathode slurry was prepared by mixing an appropriate amount of 10 wt % Kynar®HSV 900 PVDF (Arkema) in NMP (Sigma Aldrich >99% HPLC grade), the carbon conductive additive (LITX® HP) was added along with NCM 622 (available from ShanShan, China) at 75 wt % total solids in NMP. The slurry was mixed with a Thinky mixer (model ARE-310) for 30 minutes. The electrode slurries were coated on aluminum foil using an automated doctor blade coater (Model MSK-AFA-III from MTI Corp.) targeting 20 mg/cm$^2$ areal loading. The NMP was evaporated for 20 minutes in a convection oven set at 80° C. Fifteen millimeter-in-diameter discs were punched for coin-cell preparation and dried at 110° C. under vacuum for a minimum of 4 hours. Discs were calendared to 3.5 g/cc density with a MTI Manual Rolling Press (Model MR-100).

Example 10

Coin Cell Assembly

Cathode and anode discs described above were assembled into 2032 coin-cells in an argon-filled glove box (M-Braun) with anode/cathode capacity ratio of 1.25. Glass fiber micro filters (Whatman GF/A) with 17 mm diameter were used as separators. The electrolyte composition was ethylene carbonate-dimethyl carbonate (EC:DMC, 1:1 by weight) and included 10 wt % mono-fluoroethylene carbonate (FEC, Solvay Fluorides) with 1M $LiPF_6$ (Sigma Aldrich). Four coin-cells were assembled for each formulation being tested. Coin cells were formed using a Maccor series 4600A battery cycler using 2×C/10 charge-discharge formation cycles in 2.8-4.2V window. After c-rate capability evaluation, the coin cells were cycled at room temperature using CC-CV (1C-4.2V, C/20)/1D charge/discharge rates.

Example 11

Cycling Evaluation

An overview of the anode compositions for various cells used for cycling evaluation is summarized in Table 5.

TABLE 5

Figure 4:
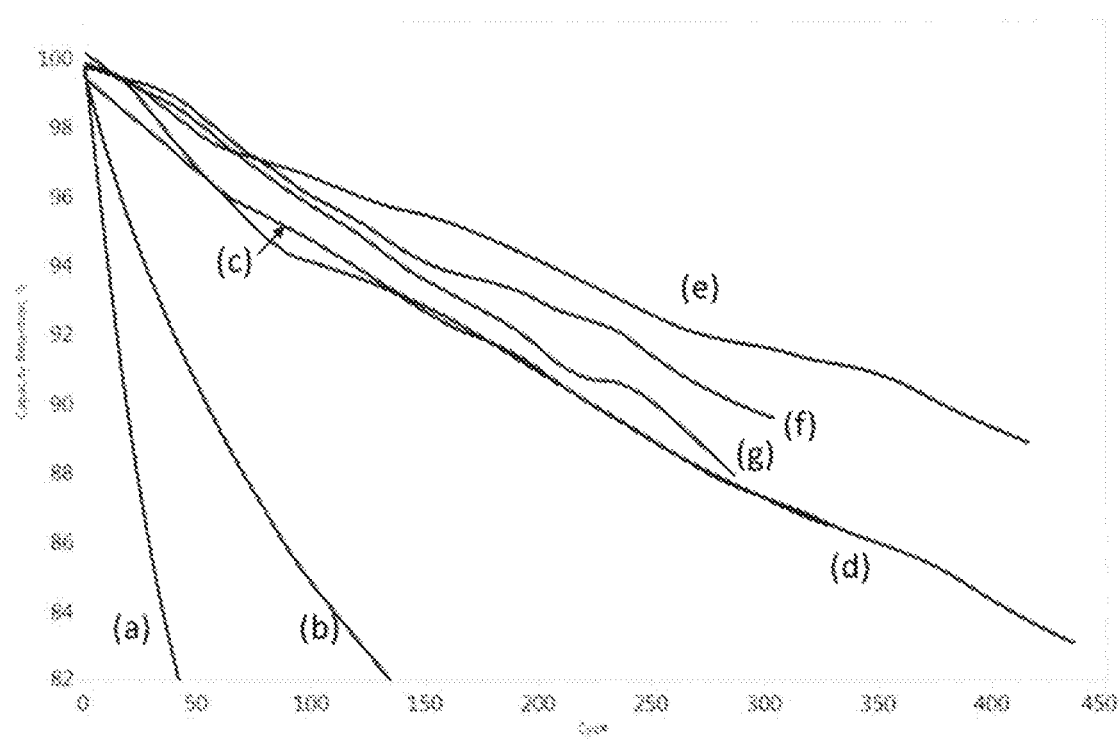
FIG. 4 is a series of plots showing the capacity retention with room temperature cycling for cells having anode compositions shown in Table 5.

| ID FIG. 4 | SiO/Graphite wt %: wt % | CB | CB (wt %) | Non CB CCA* | Source of Non CB CCA* | Non CB CCA* wt % | CMC wt % | SBR wt % |
|---|---|---|---|---|---|---|---|---|
| a | 10:90 | No | No | No | No | No | 2 | 1 |
| b | 10:90 | LITX ® HP | 2.5 | No | No | No | 2 | 1 |
| c | 10:90 | Super P ® Li | 1 | MWCNT | dispersion | 1.5 | 2 | 1 |
| d | 10:90 | No | No | CNS | Disp A | 0.55 | 2 | 1 |
| e | 10:90 | LITX ® HP | 1 | CNS | Disp A | 0.55 | 2 | 1 |
| f | 10:90 | No | No | CNS | Disp B | 0.55 | 2 | 1 |
| g | 10:90 | LITX ® HP | 1 | CNS | Disp B | 0.55 | 2 | 1 |

*Non CB CCA refers to conductive carbon additives other than carbon black (CB).

The coin cells were cycled at room temperature using CC-CV charging step (1C-4.2V, C/20) and 1C discharging step. The cell capacity retention was plotted versus cycle #. The results are reported as average from four cells for each formulation. Shown in FIG. 4 are capacity retention data for the cells with $SiO_x$—graphite anode comprising: (a) no additional conductive additive; (b) 2.5 wt % CB; (c) 1.5% MWCNT and 1% Super® P-Li; (d) 0.55% CNS from Dis A; e) 0.55% CNS Dis A and 1% CB; f) 0.55% CNS Dis B; (g) 0.55% CNS Dis B and 1% CB.

As seen in FIG. 4, the cells with no additional conductive additive at the anode showed rapid capacity decay with cycling. Having a highly conductive carbon black additive at 2.5 wt % in the anode formulation (sample (b)) helped to extend the cycle performance nearly three times (based on 80% capacity retention value). This result, however, was still significantly short when a combination of commercially available MWCNT and conductive carbon black was utilized (c). Having a combination of MWCNT and conductive carbon black additive at the same total carbon loading of 2.5% (1.5% MWCNT and 1% Super P® Li) was effective in extending the cycling performance of SiO/graphite (10:90 ratio) anodes. Even more noteworthy, the cells with anodes having CNS or a combination of CNS with a conductive carbon black additive showed either similar performance at ~⅓ of total carbon loading, for example sample (d), or showed much better cycling results at lower (~⅓ to ~½) total conductive carbon loadings.

The example highlights two important results. First, the unique features of CNS morphology promote better cycling performance for $SiO_x$-graphite anode-based cells. Second, practical approaches for using aqueous CNS dispersions (with or without a conductive carbon black additive) facilitates the use of CNSs at the lithium ion battery commercial plant, without significant disruption to the existing anode manufacturing process.

The experimental work undertaken so far has not yet determined the minimum concentration of CNS that still delivers improved performance to silicon-based anodes. It is expected, however, that the usable range for CNSs can be lower than presented here, a feature that could further extend the formulation flexibility for battery makers and allow reaching better performance metrics (for example, higher capacity, lower formulation cost, etc).

Example 12

High Temperature Cycling

High temperature cycling is considered as one of the most aggressive performance tests for cells containing Si. In this example, the cells with the anode compositions shown in Table 6 were prepared by following the methods described in Examples 3, 8 and 9. The cells were assembled according to Example 10, however the cycling was performed at 45° C. using 1C/1C rates.

TABLE 6

Figure 5:
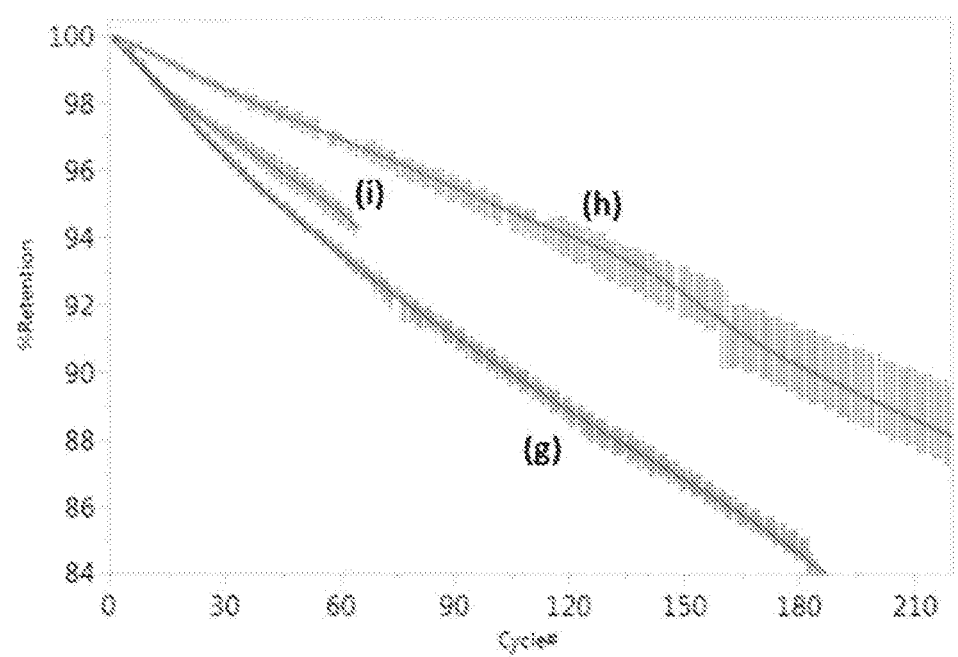
FIG. 5 is a series of plots showing the capacity retention with 45° C. cycling for cells having anode compositions shown in Table 6.

| ID FIG. 5 | SiO/Graphite wt %: wt % | CB | Non CB CCA* | Source of Non CB CCA* | Non CB CCA* wt % | CMC wt % | SBR wt % |
|---|---|---|---|---|---|---|---|
| h | 10:90 | No | CNS | Disp A | 0.37 | 2 | 1 |
| i | 10:90 | No | CNS | Disp A | 0.15 | 2 | 1 |
| g | 10:90 | No | MWCNT | Commercial dispersion | 1.5 | 2 | 1 |

*Non CB CCA refers to conductive carbon additives other than CB.

Capacity retention with the cycle number for the cells having (h), (g) and (i) anodes are shown on FIG. 5. The average value of four cells is presented for every anode formulation. While the cycling test has not been yet fully completed, the preliminary results indicate that the cells with anodes comprising CNSs outperformed the ones containing conventional MWCNTs. Strikingly, even 0.15 wt % CNS showed promising initial cycling results when compared with 1.5 wt % MWCNT. The large difference in loading of CNSs (ten-fold!) is presumably due to the unique branched and crosslinked nature of these structures. Other important contributors could be the state of CNSs in aq. dispersion and dispersing behavior of CNSs in the anode slurry.

Thus, both room temperature and high temperature cycling results showed the effectiveness of CNSs in improving performance of Si-containing anode cells at the fraction of MWCNT loading.

Example 14

SEM Analysis

Figure 7A:
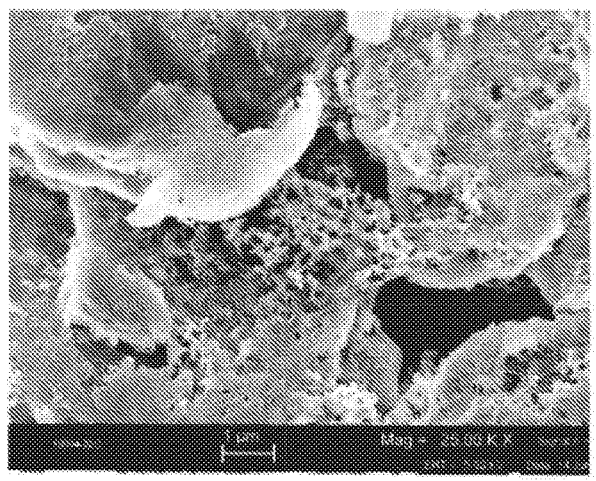
FIG. 7A is a lower magnification SEM image of an anode prepared using multiwall carbon nanotubes (MWCNTs) and Super P®-Li conductive carbon black.
Figure 7B:
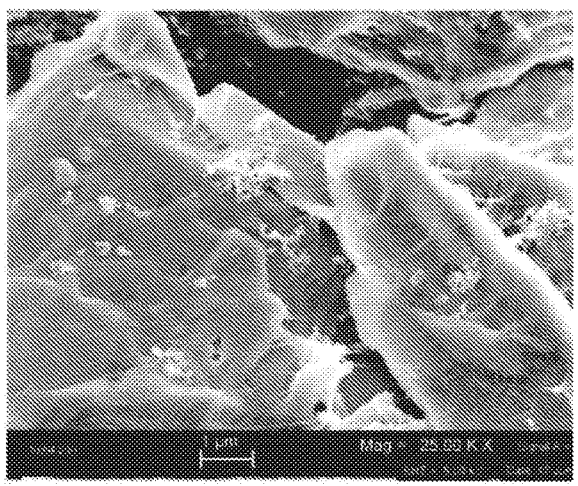
FIG. 7B is a lower magnification SEM image of an anode prepared using carbon nanostructures (CNSs) and LITX® HP conductive carbon black.

How the CNS unique morphology can help improve the performance in SiO-graphite anodes was further investigated by field emission scanning electron microscope (SEM, ZEISS Ultra Plus). Presented in FIGS. 6A and 6B are, respectively, high magnification SEM images of anodes (c) and (e) of Table 5. Lower magnification SEM images of the same (c) and (e) anodes are presented, respectively, in FIGS. 7A and 7B. As can be seen from the images obtained at high and lower resolutions, one clear advantage of CNSs over MWCNTs is the formation of a network of long (high aspect ratio) and crosslinked carbon nanotubes that connects anode active particles.

As demonstrated by the SEM analysis, electrode (e) displays a good dispersion level for both types of conductive additives (namely CNSs and LITX® HP). Importantly, one can identify branched nanostructure of CNS and its fragments with the length for some of the multiwall nanotube in the order of several microns (e.g. high aspect ratio). This is particularly evident from low magnification SEM images such as FIG. 7B.

In contrast, commercial MWCNTs (anode (c)) tend to be short in length and much more agglomerated throughout the anode. This is particularly evident on the lower magnification images, which demonstrate a clear patchiness in the coverage of anode particles with MWCNTs even when used at much higher carbon loading.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While this invention has been particularly shown and described with references to preferred embodiments thereof, it will be understood by those skilled in the art that various changes in form and details may be made therein without departing from the scope of the invention encompassed by the appended claims.

What is claimed is:

1. An aqueous dispersion, comprising:
a dispersant,
water, and
carbon nanostructures, fragments of carbon nanostructures and/or fractured multiwall carbon nanotubes,
wherein the carbon nanostructures or fragments of carbon nanostructures include a plurality of multiwall carbon nanotubes that are crosslinked in a polymeric structure by being branched, interdigitated, entangled and/or sharing common walls,
wherein the fractured multiwall carbon nanotubes are derived from carbon nanostructures and are branched and share common walls with one another, and
wherein the content of carbon nanostructures, fragments of carbon nanostructures and/or fractured multiwall carbon nanotubes is from about 0.2 to about 1.5 wt %, and the dispersion is stable against sedimentation for at least 4 weeks.

2. The aqueous dispersion of claim 1, wherein the aqueous dispersion has a viscosity of less than 5 Pa·s at a shear rate of $10\ s^{-1}$.

3. The aqueous dispersion of claim 1, wherein:
at least one of the multiwall carbon nanotubes has a length equal to or greater than 2 microns, as determined by SEM,
at least one of the multiwall carbon nanotubes has a length to diameter aspect ratio within a range of from 200 to 1000,
there are at least two branches along a 2-micrometer length of at least one of the multiwall carbon nanotube, as determined by SEM,
at least one multiwall carbon nanotube exhibits an asymmetry in a number of walls observed in an area after a branching point relative to an area prior to the branching point, and/or
no catalyst particle is present at or near branching points, as determined by TEM.

4. The aqueous dispersion of claim 1, wherein the multiwall nanotubes include 2 to 30 coaxial nanotubes, as determined by TEM at a magnification sufficient for counting the number of walls.

5. The aqueous dispersion of claim 1, wherein the aqueous dispersion has a fineness of grind of less than 20 microns as determined by ASTM D1210-05(2014).

6. The aqueous dispersion of claim 1, further comprising carbon black and/or individualized, pristine multiwalled carbon nanotubes not derived from the carbon nanostructures.

7. The aqueous dispersion of claim 1, further comprising a carbon black having a BET area of 200 $m^2$/g or less and an OAN of at least 130 mL/100 g.

8. The aqueous dispersion of claim 1, further comprising a carbon black in an amount no greater than 5 wt %.

9. The aqueous dispersion of claim 1, wherein the dispersant is selected from the group consisting of carboxymethylcellulose and its derivatives, polyvinyl pyrrolidone and its derivatives, and a styrene maleic anhydride resin and its derivatives.

10. The aqueous dispersion of claim 1, wherein the carbon nanostructures are coated.

11. The aqueous dispersion of claim 1, further comprising a thickening agent.

12. The aqueous dispersion of claim 1, wherein at least 1% of the carbon nanotubes have a length equal to or greater than 2 microns, as determined by SEM,
   a length to diameter aspect ratio within a range of from 200 to 1000, and/or exhibit an asymmetry in the number of walls observed in the area after a branching point relative to the area prior to the branching point.

13. An electrode composition comprising the dispersion of claim 1 and an active anode material.

14. The electrode composition of claim 13, wherein the active anode material includes graphite, silicon, $SiO_x$, silicon-graphite composite or lithium titanate.

15. The method of claim 14, wherein the active anode material includes graphite, silicon, $SiO_x$, silicon-graphite composite or lithium titanate.

16. A method for preparing an anode composition, the method comprising:
   forming an aqueous dispersion that includes a dispersant, carbon nanostructures, fragments of carbon nanostructures and/or fractured multiwall carbon nanotubes, wherein the content of carbon nanostructures, fragments of carbon nanostructures and/or fractured multiwall carbon nanotubes in the aqueous dispersion is from about 0.2 to about 1.5 wt %, and the aqueous dispersion is stable against sedimentation for at least 4 weeks; and
   combining the aqueous dispersion with an anode active material to form the anode composition,
   wherein the carbon nanostructures or fragments of carbon nanostructures include a plurality of multiwall carbon nanotubes that are crosslinked in a polymeric structure by being branched, interdigitated, entangled and/or sharing common walls,
   wherein the multiwall fractured carbon nanotubes are derived from carbon nanostructures and are branched and share common walls with one another.

17. The aqueous dispersion of claim 1, wherein the content of carbon nanostructures, fragments of carbon nanostructures and/or fractured multiwall carbon nanotubes is from about 0.2 to about 1.0 wt %.

18. The method of claim 16, wherein the content of carbon nanostructures, fragments of carbon nanostructures and/or fractured multiwall carbon nanotubes in the aqueous dispersion is from about 0.2 to about 1.0 wt %.

* * * * *